United States Patent [19]
Kirchhoffer et al.

[11] Patent Number: 6,122,583
[45] Date of Patent: Sep. 19, 2000

[54] UPSHIFT AND DOWNSHIFT CONTROL VALVE SYSTEM FOR MULTIPLE RATIO AUTOMATIC TRANSMISSION

[75] Inventors: Johann Kirchhoffer, Cologne, Germany; Scott Raymond Crandall, Wixom; Robert Cary Haase, Southfield, both of Mich.

[73] Assignee: Ford Global Technologies, Inc., Dearborn, Mich.

[21] Appl. No.: 08/996,489

[22] Filed: Dec. 23, 1997

[51] Int. Cl.[7] .............................. G06G 7/70; G06F 15/00
[52] U.S. Cl. .............................. 701/51; 701/53; 180/336; 477/15; 477/34; 477/69
[58] Field of Search .................... 701/51, 53; 180/336; 477/15, 34, 69

[56] References Cited

U.S. PATENT DOCUMENTS

| | | |
|---|---|---|
| 5,553,694 | 9/1996 | Schulz et al. . |
| 5,586,029 | 12/1996 | Schulz et al. . |
| 5,612,874 | 3/1997 | Schulz et al. . |
| 5,642,283 | 6/1997 | Schulz et al. . |
| 5,646,842 | 7/1997 | Schulz et al. . |
| 5,809,846 | 9/1998 | Ohkura et al. ......................... 74/733.1 |
| 5,835,875 | 11/1998 | Kirchhoffer et al. ..................... 701/51 |

*Primary Examiner*—William A. Cuchlinski, Jr.
*Assistant Examiner*—Olga Hernandez
*Attorney, Agent, or Firm*—Frank G. McKenzie; Roger L. May

[57] ABSTRACT

A control valve system for a multiple ratio transmission with a high ratio clutch and an intermediate ratio brake servo including a first solenoid operated valve that generates a control pressure for intermediate servo apply and a second solenoid operated valve that generates a control pressure for intermediate servo release and for the high clutch. The second and the first solenoid valves control the intermediate servo stroke phase and the second solenoid valve controls, either closed or open loop, the deceleration of a high clutch drum. Pressures electronically controlled by the solenoid valves are distributed to the clutch and brake servo pressure chambers by a shift valve configuration, whereby high quality upshifts and downshifts are achieved.

11 Claims, 31 Drawing Sheets

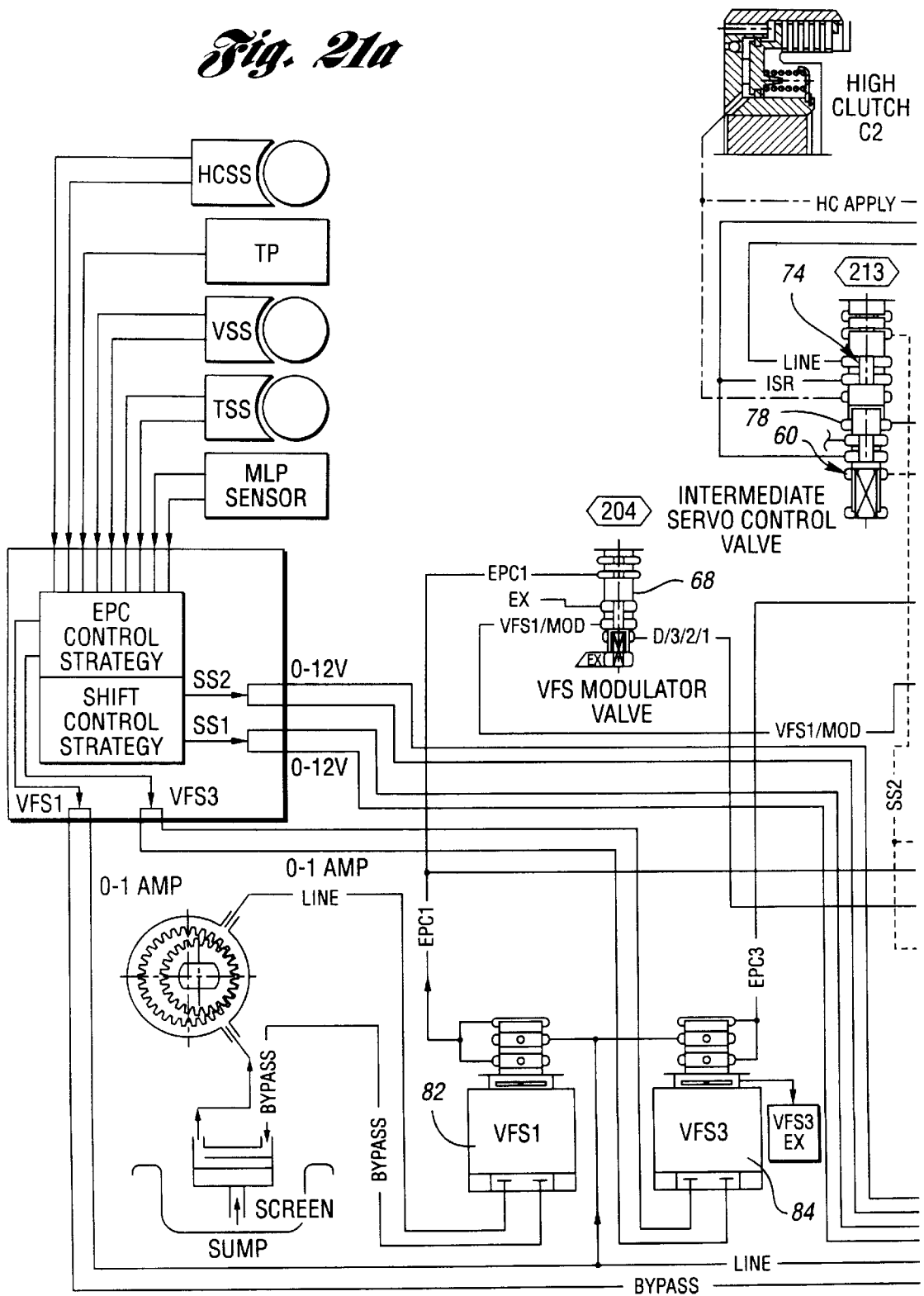

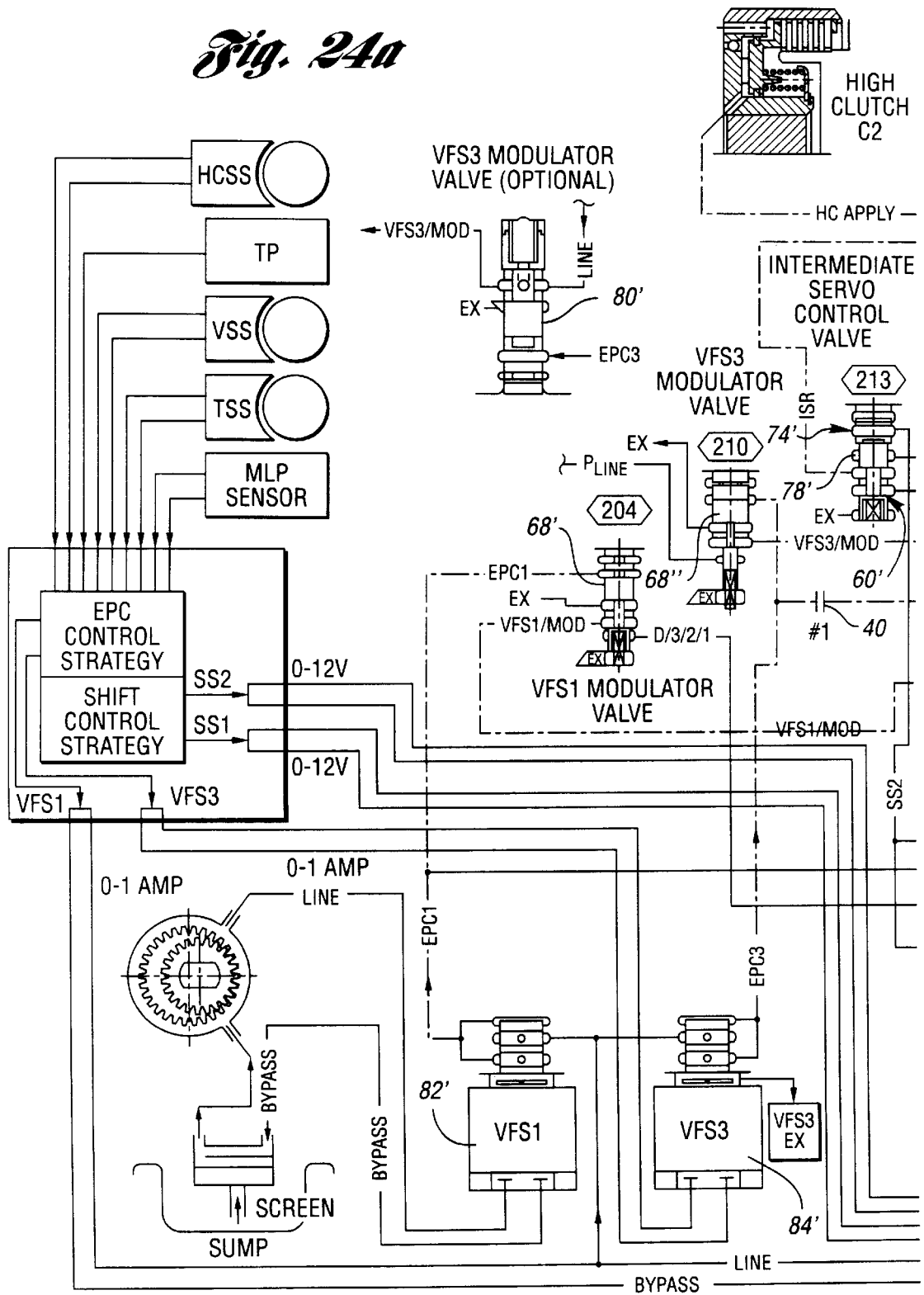

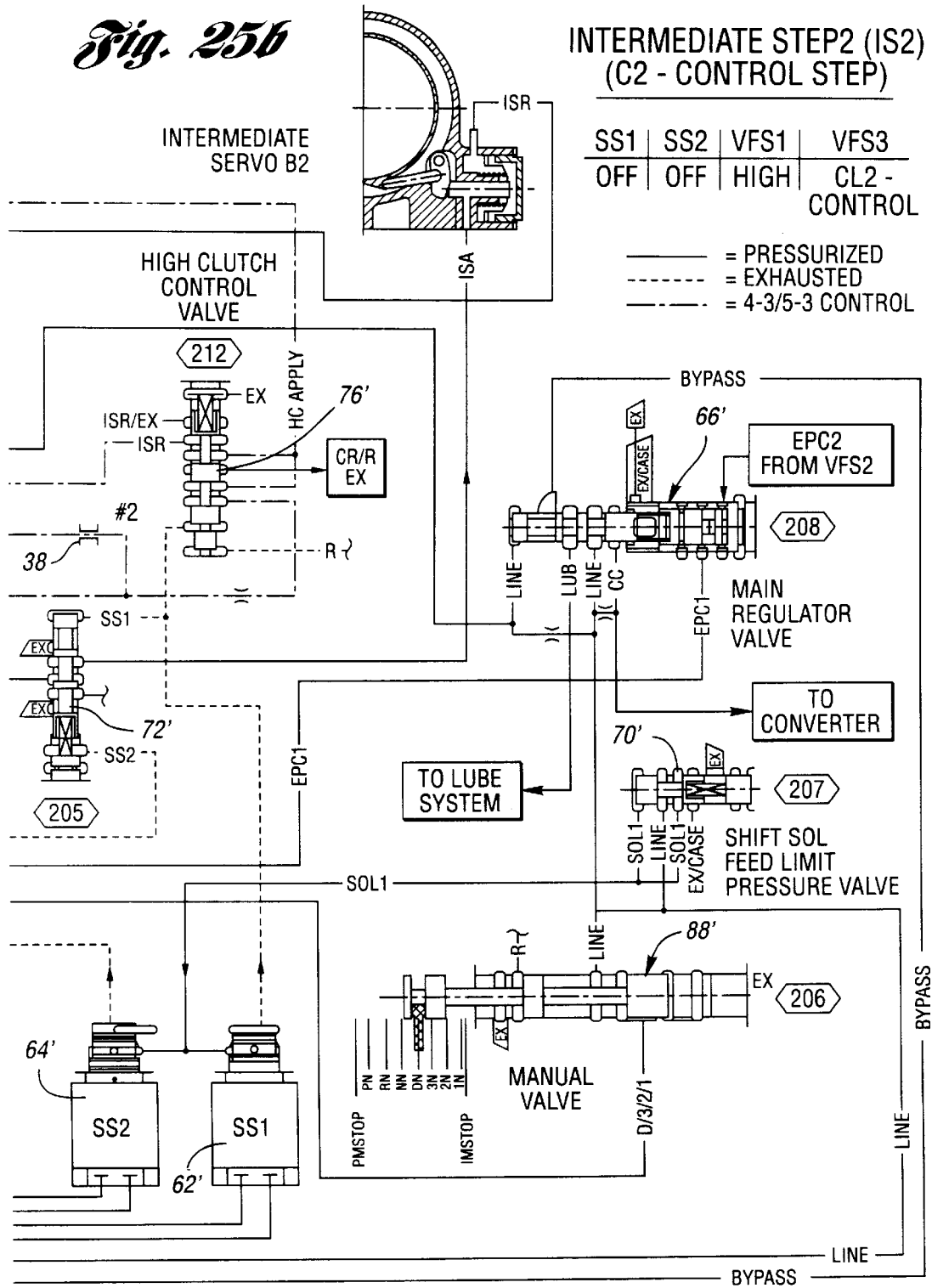

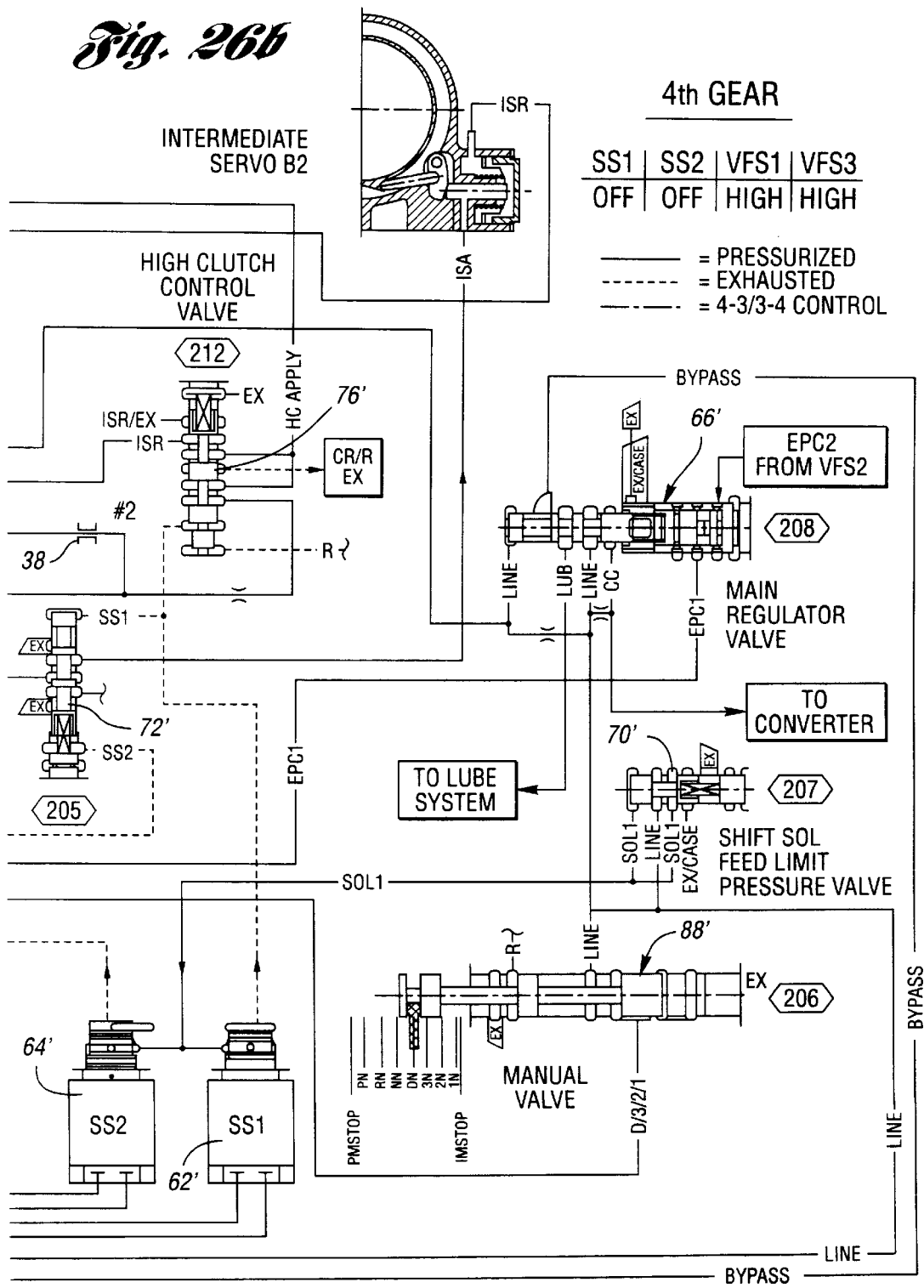

UPSHIFT AND DOWNSHIFT CONTROL VALVE SYSTEM FOR MULTIPLE RATIO AUTOMATIC TRANSMISSION

TECHNICAL FIELD

The invention relates to multiple ratio automatic transmissions for automotive vehicles and to an electronically controlled valve system for controlling ratio changes.

BACKGROUND OF THE INVENTION

The transmission of the present invention includes a three speed ratio gear system commonly referred to as a Simpson gear set, and a two speed ratio simple planetary gear unit arranged in series. In this respect, the gearing of the transmission of the present invention has features that are common to the gearing arrangement of U.S. Pat. No. 5,586,029, which has four forward driving speed ratios and a single reverse speed ratio. A five speed ratio version of the gearing of the '029 patent is described in U.S. Pat. No. 5,642,283. Reference may be made to these patents to supplement the disclosure of the present invention. They are owned by the assignee of the present invention and are incorporated herein by reference.

The simple planetary gear unit of the '283 patent is used to establish an additional ratio having a numerical value that is greater than the lowest ratio of the four speed gearing of the '029 patent, but which is less than the second ratio of the gearing of the '029 patent. A transition from the second ratio to the third ratio of the present transmission, like the corresponding ratio transition of the transmission of the '283 patent, involves a swapping or interchanging of reaction elements for the simple planetary gear unit and for the Simpson gear unit. The additional ratio converts the four speed gearing of the transmission of the '029 patent into a five speed ratio transmission.

Ratio changes in the five speed ratio version of the transmission may be controlled by a control valve system of the kind disclosed in U.S. Pat. No. 5,646,842. This involves the use of a reaction brake and a drive clutch, where the reaction brake establishes a reaction point for the common sun gear of the Simpson gear set and the drive clutch establishes a gear ratio of unity for the Simpson planetary gear set. The transition between second and third gear ratio involves the simultaneous engagement of the drive clutch and the disengagement of the reaction brake, which is referred to as a synchronous reaction-to-drive shift. The 3-2 downshift is the reverse of a 2-3 shift and is referred to as a synchronous drive-to-reaction shift.

A non-synchronous adaptation of a gearing arrangement of the kind shown in the preceding patents would include an overrunning coupling and a friction brake for establishing a reaction point for the common sun gear of the Simpson gear set and a separate overrunning coupling for clutching together two elements of the simple planetary gear unit. An upshift from the third ratio to the fourth ratio and a downshift from the fourth ratio to the third ratio, as well as a downshift from the fifth ratio to the third ratio in the non-synchronous version of the gearing, require the use of two overrunning couplings and the engagement or release of only a single friction element. The control of these ratio shifts requires the engagement and release of the reaction brake or clutch on upshifts and downshifts.

To control the friction elements of the transmission of the '842 patent, a single variable force solenoid is used to establish the reaction brake pressure for the Simpson gear set reaction point as well as the reaction brake pressure for the simple planetary gear unit. A friction clutch, which is used to establish a third speed ratio, has its pressure controlled by the same variable force solenoid. The clutch that is used for third (fourth in 5-speed version) speed ratio operation is the same clutch that is used for reverse operation. Thus the capacity of the clutch must be established at a high level. Because of the driveline torque requirements for reverse, that torque level is greater than the torque level that is needed for establishing a reaction point for third (fourth in 5-speed version) speed ratio operation. The absence of independent control of the high ratio clutch and the reaction brake for third ratio operation leads to a design compromise that might affect shift quality of the transmission during upshifts from the third ratio to the fourth ratio, as well as downshifts from the fourth ratio to the third ratio and from the fifth ratio to the third ratio.

BRIEF DESCRIPTION OF THE INVENTION

It is an object of the present invention to improve the quality of upshifts from the third ratio to the fourth ratio as well as downshifts from the fourth ratio to the third ratio and from the fifth ratio to the third ratio in a gearing arrangement of the type shown in U.S. Pat. No. 5,642,283. This is accomplished by providing an additional variable force solenoid that is dedicated to the control of the high clutch. Thus, the high clutch can be controlled independently of the torque transmission requirements of the intermediate servo. The intermediate servo thus has its own variable force solenoid that can be calibrated separately, depending upon the torque requirements of the intermediate servo. The variable force solenoid for the high clutch is used to control the flow of fluid to and from the high clutch during ratio changes. The variable force solenoid that controls the intermediate servo is used to control intermediate servo pressure during ratio changes.

A transmission embodying the invention has planetary gear elements including a sun gear, a ring gear and a planetary carrier assembly defining torque flow paths. The high clutch connects together two of the gear elements to effect a high ratio. The intermediate servo applies an intermediate brake to effect an intermediate underdrive ratio. The high clutch as a clutch apply pressure chamber and the intermediate servo has a brake apply pressure chamber and a brake release pressure chamber. The solenoid that controls the brake release pressure in the intermediate servo also controls the clutch apply pressure. The other solenoid controls brake apply pressure.

A second brake that is involved in a downshift from the fifth ratio to the third ratio is similar to the brake that is involved in a downshift from the fourth ratio to the third ratio and is released synchronously with respect to the first brake.

BRIEF DESCRIPTION OF THE DRAWINGS

FIGS. 21a and 21b are schematic valve diagrams corresponding to FIGS. 20a and 20b wherein the valve elements are conditioned for 4-3 and 3-4 shifts with an intermediate step 2 during ratio changes between the fourth ratio and the third ratio.

FIGS. 24a and 24b is a valve diagram corresponding to FIGS. 23a and 23b with the valve elements positioned for intermediate step 1 on a ratio change between fourth ratio and third ratio.

FIGS. 25a and 25b is a control valve diagram corresponding to the diagram of FIGS. 24a and 24b wherein the valve elements are conditioned for intermediate step 2 in a ratio change between fourth ratio and third ratio.

FIGS. 26a and 26b is a view of the overall control valve system corresponding to the view of FIGS. 25a and 25b wherein the valve elements are conditioned for fourth ratio operation.

PARTICULAR DESCRIPTION OF THE INVENTION

The transmission of the present invention includes a simple planetary gear unit and a Simpson-type gear unit as disclosed in U.S. Pat. No. 5,642,283, for example, as well as the other patents identified in the preceding discussion.

The Simpson gear set and the overdrive planetary gear unit are arranged in series, the overdrive gear unit being disposed between a hydrokinetic torque converter and the torque input element of the Simpson gear set. The intermediate ratio brake B2 of the present invention, which is applied during third speed ratio operation, is a band brake, which anchors a common sun gear for the Simpson gear set. The reaction brake for the simple planetary gear unit is applied during second ratio operation, but is released during third speed ratio operation. Thus, there is a swapping of the brakes as a ratio change occurs between the second ratio and the third ratio.

During fourth ratio operation, the brake B2 is released and a friction clutch C2 is applied, which establishes a direct drive ratio through the Simpson gear set. Thus, the 3-4 upshift and the 4-3 downshift are synchronous shifts. There is no need for an overrunning coupling and a corresponding intermediate clutch for anchoring the common sun gear reaction element of the Simpson gear set as in a typical non-synchronous transmission gearing arrangement.

Figure 11:
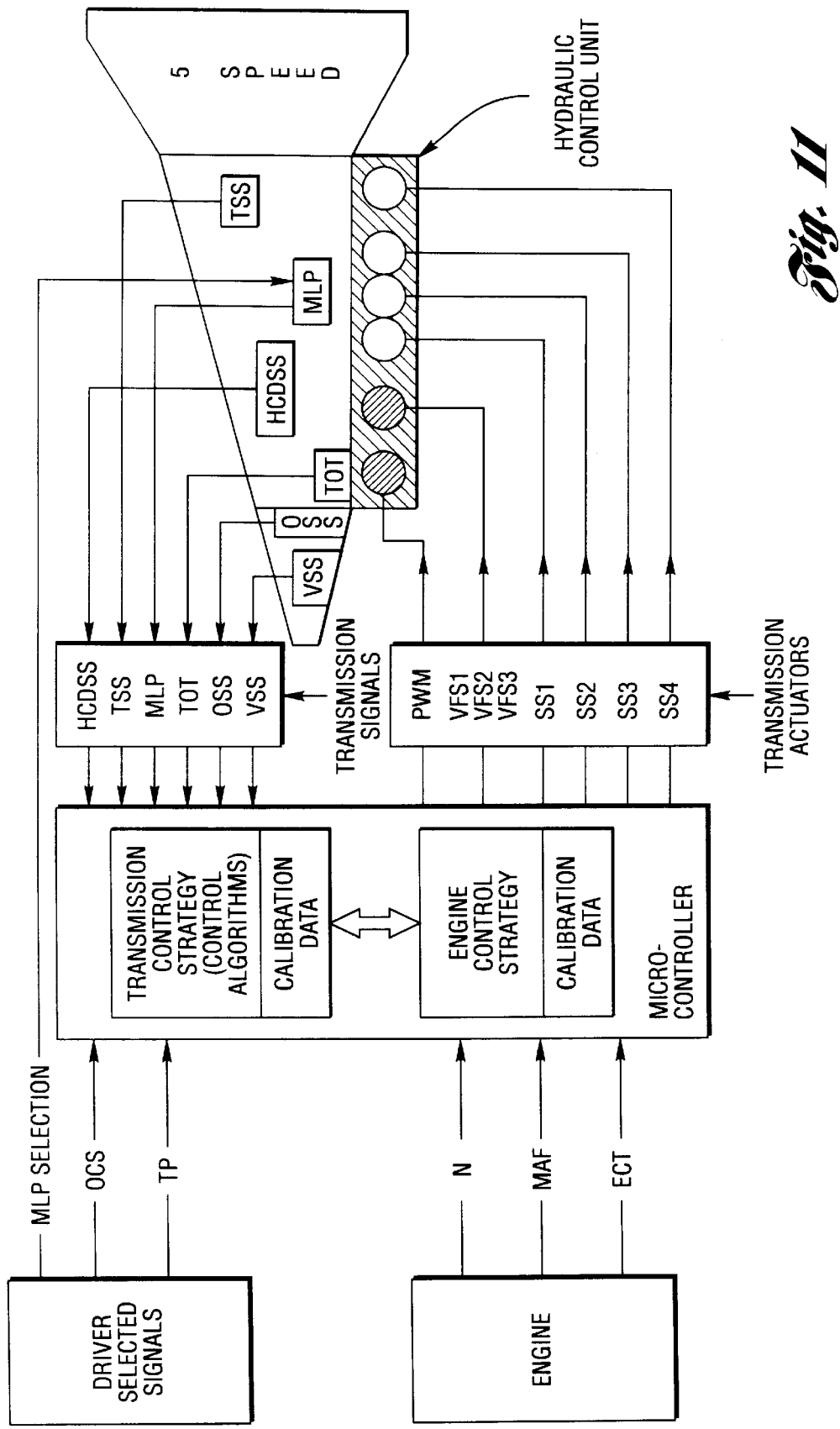
FIG. 11 is a schematic signal flow overview of the transmission signals, transmission actuators, the microprocessor, and the transmission sensors for the control system of the present invention.

FIG. 11 shows the overall control system for the driveline including the engine, the processor, the transmission and the signals developed by the driver, the engine and the transmission that are used by the processor. These signals interact, one with respect to the other. The driver signals are identified in FIG. 11 as OCS and TP signals. The transmission sensors are identified by the symbols VSS, TSS, MLP, TOT, OSS, and HCDSS. The engine signals are identified by the symbols N, MAF, and ECT.

The symbol OCS refers to the overdrive cancel switch. The symbol TP refers to the throttle position. The term VSS refers to the vehicle speed sensor at the output shaft of the transmission. The term TSS refers to the turbine speed sensor at the input shaft of the transmission. The term MLP refers to the manual level position at the transmission, which selects the drive range. The term OSS refers to output shaft speed sensor and the term HCDS refers to high clutch drum speed. The engine sensors monitor RPM, which is the engine speed; MAF, which is the mass air flow; and ECT, which is the engine coolant temperature.

The control system includes two ON/OFF solenoids identified in the schematic drawings as SS1 and SS2. These control ratio shifts. It has one variable force solenoid for controlling B2 brake capacity, which is identified in the drawings as VFS1. A separate variable force solenoid, identified as VFS3, varies the capacity for the clutch C2 which, when applied, locks up the Simpson gear set for 1:1 ratio operation.

Thus, there is one pressure regulator (VFS1) dedicated to the control of the intermediate ratio band B2 and one pressure regulator (VFS3) is used to control the direct clutch C2. Unlike the control systems of the previously described patents, where only one capacity modulator is used to control capacity and the synchronization of brake B2 and clutch C2, the present invention uses a single variable force solenoid VFS1 that is dedicated to intermediate brake band control.

The foregoing signals are used by shift modulator valves to actuate shift valves that in turn release and apply hydraulic pressure to the torque transmitting elements B1 and C2. The modulator valves adjust the amount of the clutch capacity applied to the friction elements.

Figure 12:
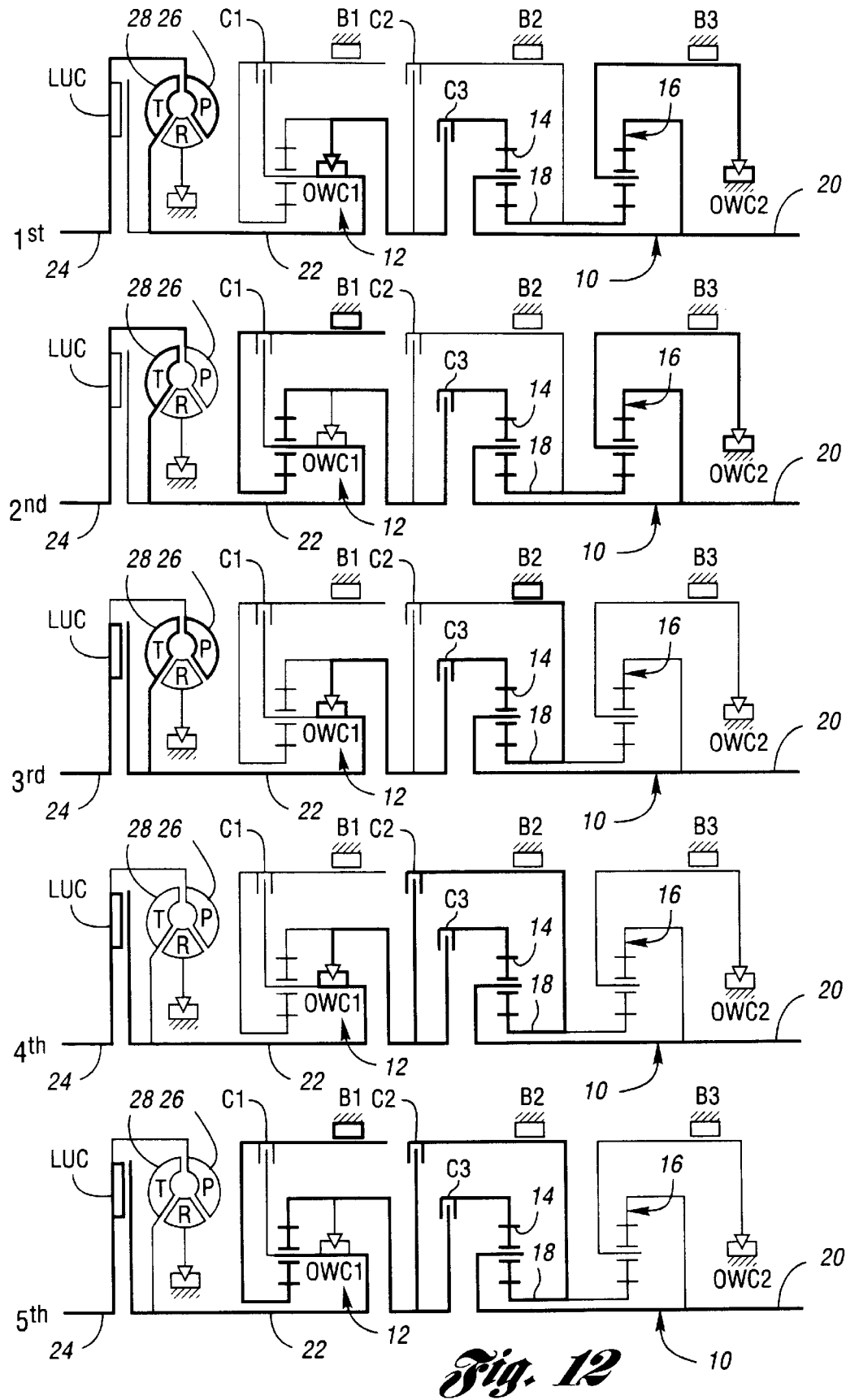
FIG. 12 is a schematic representation showing the torque transmitting gear elements for a gear system that is controlled by the improved control system of the invention.

FIG. 12 shows in schematic form the torque flow path for the transmission gearing. It includes a Simpson gear set 10 and a simple planetary overdrive gear unit 12. Simpson gear set 10 has two simple planetary gear units 14 and 16 with a common sun gear 18. The carrier of unit 14 and the ring gear of gear unit 16 are connected to torque output shaft 20. The carrier of gear unit 16 is anchored against rotation in one direction by an overrunning coupling identified as OWC2 during operation in the first ratio. Brake B3 shown in FIG. 11 would be anchored if coast braking is desired.

Sun gear 18 of the Simpson gear set is adapted to be anchored by brake B2. Forward drive clutch C3 provides input torque to the ring gear of the planetary gear unit 14. During operation in each forward driving ratio, clutch C3 is adapted to distribute torque from the torque input shaft 22 to the common sun gear 18 for the Simpson gear set.

The simple planetary gear unit 12 has a ring gear which is coupled by OWC1 to the carrier of the gear unit 12 during operation whenever brake band B1 is released. Brake band B1 anchors the sun gear of the gear unit 12 to provide an overdrive mode for the gear unit 12. A coast clutch C1 is used when coast braking is desired since the overrunning coupling OWC1 cannot deliver torque in both directions.

The engine crankshaft is connected to shaft 24, which drives the impeller of the impeller 26 of the hydrokinetic torque converter. The turbine 28 of the hydrokinetic torque converter delivers torque to the input shaft 22.

During operation in each forward driving ratio, clutch C3 is applied. In the first driving ratio, overrunning coupling OWC1 is engaged so that turbine torque is delivered through clutch C3 to the ring gear of gear unit 14 for the Simpson gear set. Reaction torque for the Simpson gear set is distributed to the transmission case through coupling OWC2 during first ratio operation. On a ratio change from the first ratio to the second ratio, brake B1 is applied. This releases the coupling OWC1 as the sun gear for gear unit 12 is anchored. Turbine torque then is delivered through the planetary gear unit 12 with a reduced torque multiplication. The carrier for gear unit 16 continues to act as a reaction point during second ratio operation.

During third ratio operation, brake band B1 is released and brake band B2 is applied. This overspeeds ring gear 14 relative to the sun gear 18 of the Simpson gear set and the overrunning coupling OWC1 reapplies, thus establishing a 1:1 ratio in the gear unit 12.

A ratio change from the third ratio to the fourth ratio involves disengaging brake B2 and applying clutch C2. This locks up the Simpson gear set for unitary ratio operation. Simultaneously, the planetary gear unit 12 becomes locked up for unitary ratio operation by the overrunning coupling OWC1.

Fifth ratio operation is achieved by reapplying brake B1, thereby causing the overrunning coupling 12 to assume an overrunning condition. Brake band B2 remains disengaged and clutch C2 remains applied.

For the purpose of understanding the mode of operation of a five-speed ratio transmission corresponding to the transmission of FIG. 12 but which is characterized by a non-synchronous 3-4 upshift, 4-3 downshift, and 5-3 downshift, reference will be made to FIG. 10. Corresponding elements of the transmission of FIG. 10 that have counterpart elements in the transmission of FIG. 12 have been indicated in FIG. 10 by similar reference characters although prime notations are added.

Figure 10:
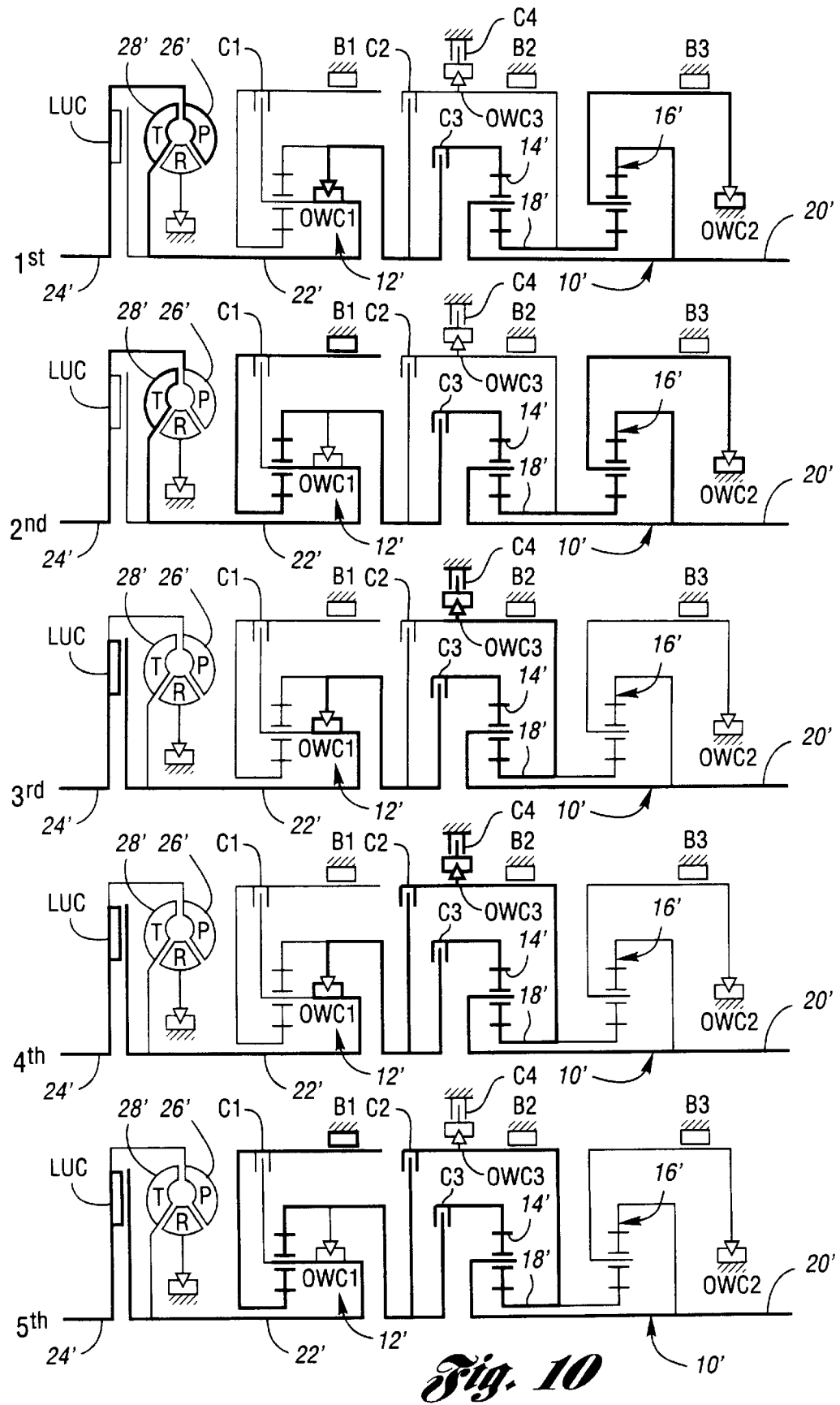
FIG. 10 is a schematic representation of the gearing elements for a transmission that does not have the synchronous upshift and downshift features of the present invention.

The torque flow through the transmission shown in FIG. 10 is the same as that previously described with reference to FIG. 12. In the case of the transmission of FIG. 10, however, a friction brake C4 and an overrunning coupling OWC3 are added to provide a reaction point for the sun gear 18' of the Simpson gear set 10'. The overrunning coupling OWC3 functions in the same manner as brake B2 of the transmission shown in FIG. 12, although it is capable of accommodating torque transfer in one direction only. Brake B2 in the embodiment of FIG. 10 is used for coast braking purposes.

A 3-4 upshift in the case of the transmission of FIG. 10 is accomplished in a non-synchronous manner. As clutch C4 remains applied, the overrunning coupling OWC3 overruns when the ratio change to the fourth ratio is commanded. This does not involve a release of a brake and the application of a friction clutch as in the case of the transmission of FIG. 12 where brake B2 is released and clutch C2 is applied on a 3-4 upshift and where clutch C2 is released and brake B2 is applied on a 4-3 downshift or on a 5-3 downshift.

On a gear change from the fourth ratio to the third ratio in the transmission of FIG. 10, clutch C2 is released. Engine torque then accelerates the high clutch drum up to the point where OWC3 holds the reaction torque as clutch C4 is still engaged. No synchronization is required during this ratio change.

The improved control system of the present invention eliminates the need for providing an intermediate clutch C4 and an intermediate one-way clutch OWC3. It does this by establishing electronically controlled synchronization of 3-4 upshifts, 4-3 downshifts, and 5-3 downshifts which are synchronized by the engagement of the intermediate band B2 and the high clutch C2.

The 3-4 upshift, the 4-3 downshift, and the 5-3 downshift of the transmission of FIG. 12 is illustrated in the following chart, which represents the active and inactive states of the solenoids that control the shift valves.

| GEAR | SS1 | SS2 | VFS1 | VFS3 | C2 | B2-Apply | B2-Release |
|---|---|---|---|---|---|---|---|
| 3rd | ON | ON | -Hold Static B2 - Capacity Controlled | HIGH | EX | VFS1-Mod | EX |
| Intermediate Step 1 | OFF | ON | Controlled | EPC3-Control | VFS1-Mod | EPC3-Control |
| Intermediate Step 2 | OFF | OFF | HIGH | Controlled | EPC3-Control | VFS1-Mod | Pline |
| 4th | OFF | OFF | HIGH | Hold CL2-Capacity | EPC3 | VFS1-Mod | Pline |
| 5th Gear (4th Plus Overdrive) | OFF | OFF | HIGH | CL2-Control | EPC3 | VFS1-Mod | Pline |

Control = Open loop or closed loop capacity control depending on an upshifting or downshifting event.
High = Any VFS-state higher than zero pressure
EX = Exhausted The foregoing chart is a subset of the following chart, which identifies the solenoid states for the entire transmission of the invention rather than merely the states of the solenoids involved in 3-4 upshifts, 4-3 downshifts, and 5-3 downshifts.

Two of the three variable force solenoids are used for capacity control. VFS3 is used for capacity control of clutch C2 and variable force solenoid VFS1 is used for control of the capacity of brake B2. With this shift valve configuration, independent capacity control for each affected capacity

SOLENOID & ELEMENT STAGES

| STEP/GEAR | SS1 | SS2 | SS3 | SS4 | VFS1 | VFS2 | VFS3 | B1 | OWC1 | C2 | C3 | B2 | OWC2 | B3 | C1 |
|---|---|---|---|---|---|---|---|---|---|---|---|---|---|---|---|
| 1st | ON | OFF | OFF | ON | H | L | L | | ▓ | | ▓ | | ▓ | | |
| 2nd | ON | OFF | ON | ON | H | H | L | ▓ | | | | | ▓ | | |
| IS 3 | ON | ON | ON | ON | C | C | L | ▓ | | | | ▓ | | | |
| 3rd | ON | ON | OFF | ON | H | L | L | ▓ | | | | ▓ | | | |
| IS 1 | OFF | ON | OFF | ON | C | L | C | ▓ | | | | ▓ | | | |
| IS 2 | OFF | OFF | OFF | ON | C | L | C | ▓ | | ▓ | | ▓ | | | |
| 4th | OFF | OFF | OFF | ON | H | L | H | ▓ | | ▓ | | | | | |
| 5th | OFF | OFF | ON | ON | H | H | H | ▓ | ▓ | | | | | | |
| 4th + ODC | OFF | OFF | OFF | OFF | H | H | H | | | ▓ | | | | ▓ | |
| N | ON/x | ON/x | OFF/x | ON | L | L | L | | | | | | | | |
| R | ON | OFF | OFF | ON | H | L | C | | | ▓ | | | | ▓ | |
| R Inhibition | ON | ON | OFF | OFF/ON | L | H | L | | | ▓ | | | | | |

H = High, L = Low, C = Control
Shaded Boxes = Element engaged or control
Unshaded Boxes = Element Disengaged The electronic-mechanical interface for the 3-4, 4-3 and 5-3 shift control system requires only two of the three ON/OFF solenoids and two of the three variable force solenoids in order to execute the shifts. The ON/OFF solenoids are required to activate or terminate the capacity control on brake B2 and clutch C2 by applying or controlling or exhausting the clutch and band pressures. A shift valve configuration activated by the two affected ON/OFF solenoids is used to apply or release the clutch and brake band pressures.

element is possible for 3-4 upshifts as well as for 4-3 and 5-3 downshifts. Intermediate step 1 (IS1) and intermediate step 2 (IS2) are used to synchronize application and release of B2 and C2 for a 3-4 upshift or a 4-3/5-3 downshift.

Unlike the sensors used in the control system of U.S. Pat. No. 5,642,283, the control system for the present transmission uses a high clutch drum speed sensor (HCDS) rather than an overdrive drum speed sensor. The high clutch drum speed sensor determines the speed of the high clutch drum C2.

The high clutch drum speed sensor HCDS is a variable reluctance sensor in which the signal pulses are established by teeth on the high clutch drum as the teeth pass through the magnetic field established by the sensor. Since the high clutch drum is connected to the common sun gear of the Simpson gear unit, the high clutch drum speed sensor monitors the sun gear speed.

The 3-4 upshift and the 4-3 and 5-3 downshifts are synchronous shifts. The following chart provides a summary of the elements that are involved in these shifts.

| Shifts | 5-Speed Transmission |
|--------|----------------------|
| 3–4    | Reaction to Drive (B2 to C2) |
| 4–3    | Drive to Reaction (C2 to B2) |
| 5–3    | Drive/Reaction to Reaction (C2/B1 to B2) |

The synchronous 3-4 upshift is a synchronous reaction to drive shift. The reaction element is the intermediate brake band B2 and the drive element is the high clutch C2. The 3-4 upshift corresponds to a 2-3 upshift in the four-speed transmission of U.S. Pat. No. 5,646,842.

Figure 1:
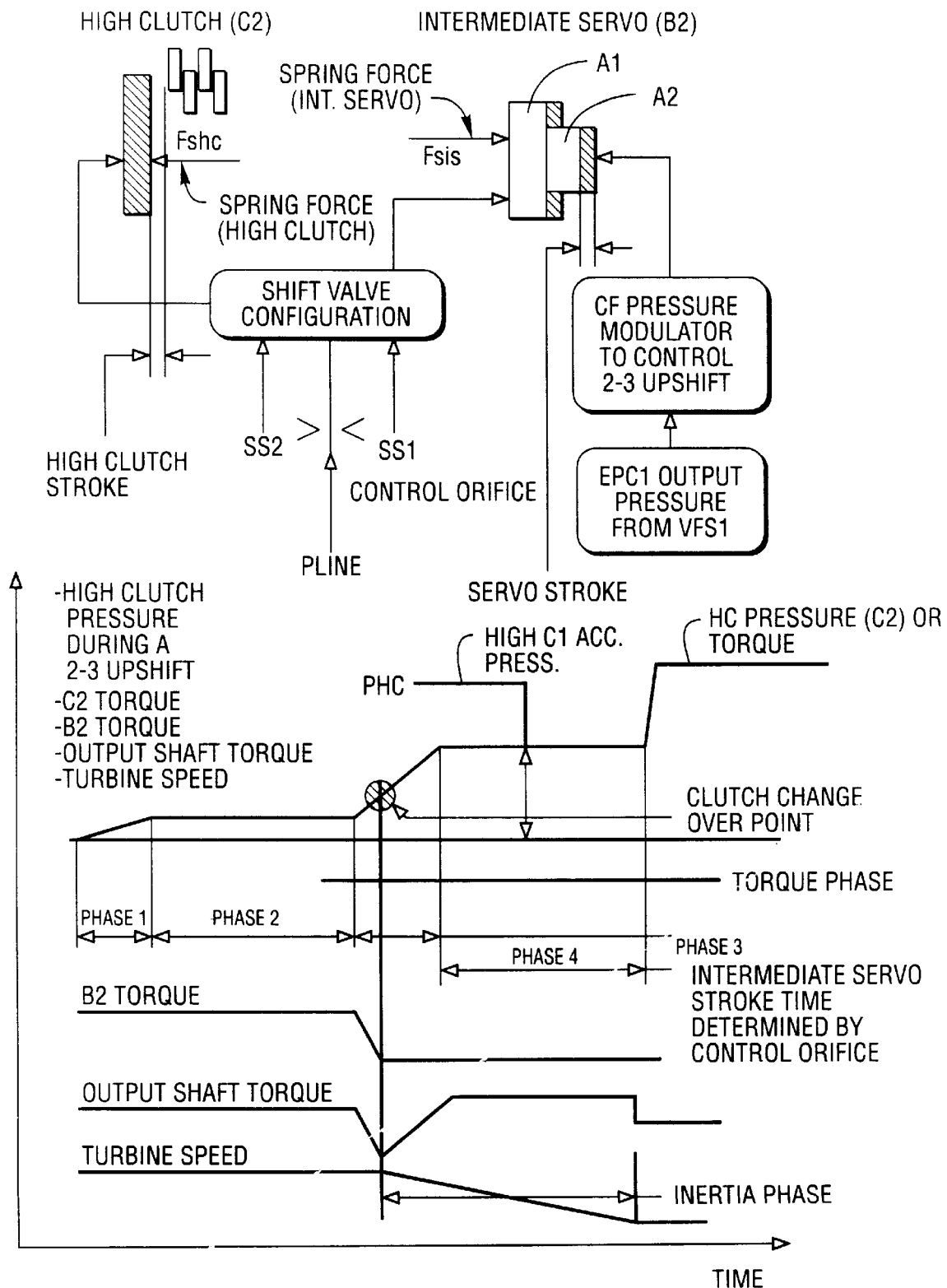
FIG. 1 is a schematic diagram illustrating the high clutch and the intermediate servo involved in a control valve system for controlling 2-3 upshifts in a gearing arrangement of the kind shown in U.S. Pat. No. 5,646,842. This diagram will be used for the purpose of providing an understanding of the improvements of Applicant's shift control system.

FIG. 1 shows the shift dynamics of a 2-3 upshift for a transmission of the kind shown in U.S. Pat. No. 5,646,842. An understanding of this upshift is necessary in order to understand the dynamics of a 3-4 upshift for the present transmission.

In FIG. 1, the high clutch is fed with pressurized fluid through the shift valve configuration, which is supplied with line pressure through a control orifice. The intermediate servo B2 is supplied with line pressure on its release side A1 by the shift valve configuration. The apply side of the servo A2 is supplied with CF pressure from a pressure modulator valve which, in turn, is in communication with a variable force solenoid (VFS1).

The capacity of the high clutch C2 is established to provide sufficient braking capacity for reverse drive. The high clutch in this case is subjected to full input shaft torque. In third gear or during a 2-3 upshift, the high clutch carries only a fraction of the input shaft torque depending upon the gear ratio as the high clutch has excess capacity for a 2-3 upshift.

In order to compensate for the excess capacity of the high clutch, the intermediate servo B2 stroke volume is used to establish an accumulator effect for the high clutch C2.

Figure 6:
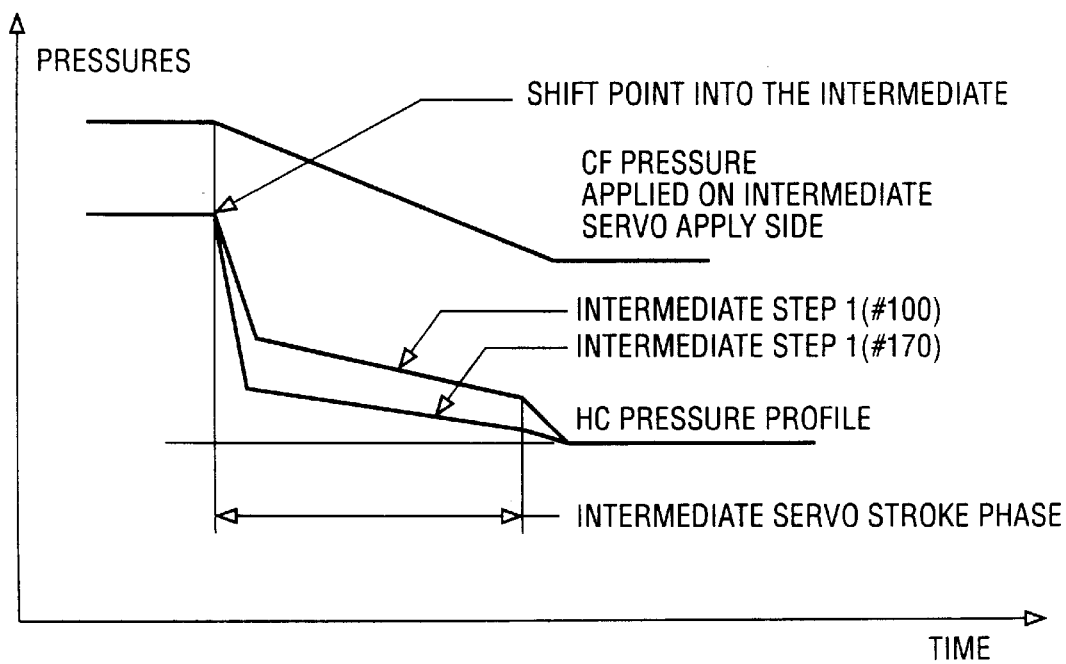
FIG. 6 is a plot of pressure variations during a shift interval for the clutch and brake servos of FIG. 5.

FIG. 6 shows the variation, during the 4-3/5-3 downshift interval, of the turbine speed, the output shaft torque, B2 torque, and high clutch pressure.

The intermediate servo has differential areas at A1 and A2, the release side having the larger area A1. An intermediate servo return spring acts to stroke the servo piston to its release position. The servo release side is applied with line pressure and the servo apply side is connected to a clutch pressure modulating device, thereby subjecting it to CF pressure. The stroking of the intermediate servo piston establishes the accumulator effect for the high clutch during a 2-3 upshift.

During phase 1 of the shift indicated in FIG. 1, the high clutch is filled with pressurized fluid. During phase 2, the high clutch is stroking. At that time, the stroke pressure is determined by the equation:

$$\text{HC Stroke Pressure} = F_{shc}/A_{hc},$$

here $F_{shc}$=spring force on the high clutch and $A_{hc}$ is the pressure area of the high clutch.

In phase 3 of the 2-3 upshift, shown in FIG. 1, the high clutch is synchronized with respect to the intermediate band. The pressure applied on the high clutch pressurizes the friction plates and the high clutch starts to transmit torque. The high clutch pressure rises and decreases the reaction torque on the intermediate brake band B2 since the high clutch pressure is also applied on the release side area A1 of the intermediate servo. At the point when the reaction torque provided by the intermediate servo is zero, the intermediate servo begins to stroke and the high clutch transmits full torque. The output shaft torque characteristic changes at that point from a negative slope, representing a reaction torque reduction of the intermediate band, to a positive high clutch pressure or torque characteristic. The synchronization between the engagement of the high clutch and the release of the intermediate band then is complete.

In phase 4 of the shift shown in FIG. 1, pressure accumulation takes place. The system is provided with line pressure through the shift valve circuit. The load applied at the apply side A2 of the servo B2 determines the high clutch accumulation pressure. The force created by the pressure on the release side of the servo is an equilibrium with the load applied on the apply side. Changing the load on the apply side will change the accumulation pressure and time. This relationship is represented by the following equation:

$$PHC = (CF^*A2)/A1 - F_{sis}/A1$$

where:
PHC=High clutch accumulation pressure;
CF=Electronically controlled clutch pressure applied on the intermediate band;
$F_{sis}$=Intermediate servo release spring load;
A1=Release area of the intermediate servo; and
A2=Apply area of the intermediate servo.

The CF pressure is electronically controlled. By changing the EPC pressure, the CF pressure is varied and this in turn changes the high clutch accumulation pressure and time. The accumulation time is determined by the size of the control orifice, which allows a metered flow to pass to the high clutch, and by the stroke distance of the intermediate servo. The source of pressurized fluid flow is line pressure. Accumulation time, however, is not consistent, especially at high pressure operation modes. The higher the servo size and the higher the high clutch pressure, the shorter is the accumulation time. The metering of the fluid by the control orifice usually is not sufficient enough to match the appropriate accumulation time to the required shift time.

During this time, the inertia phase on the 2-3 upshift is executed. When the intermediate servo has stroked, the high clutch pressure rises to the line pressure level. When the intermediate servo has stroked and the shift is not yet complete, the remaining part of the shift will be executed with elevated line pressure, which results in uncomfortable shift harshness.

In contrast to the shift harshness that might be obtained with a transmission of the type shown in U.S. Pat. No. 5,646,842, the upshift control system of the present invention, shown in FIG. 13, will achieve smooth ratio changes.

Figure 3:
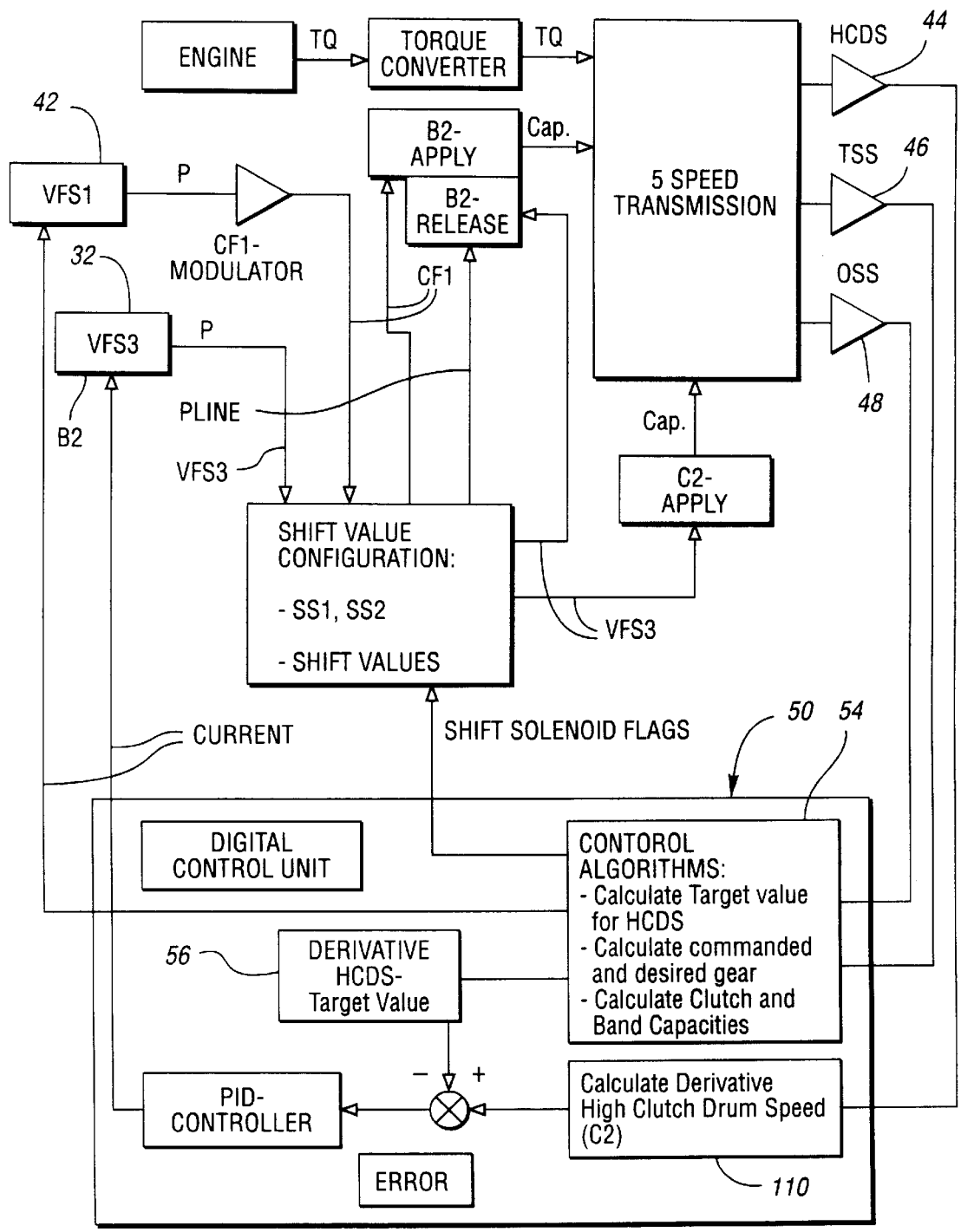
FIG. 3 is a schematic representation of the principal elements of a valve system involved in a 3-4 upshift and a 4-3 downshift for a transmission embodying the improvements of the invention.

The improved control system as a whole is shown in block diagram form in FIG. 3. The upshift control system of FIGS. 3 and 13 has features that are common to the control system of the '842 patent. The major distinction is the presence of a variable force solenoid VFS3. This solenoid is shown at 32 in FIG. 13. It acts conjunction with a VFS3 modulator valve 34, which applies pressure to the high clutch through control orifice 36. Pressure distributed from solenoid valve VFS3 takes place through orifice 38, seen in FIG. 13. If orifice 38 is closed, pressure will be distributed through a second orifice 40, which bypasses the modulator valve 34 as pressure is distributed to the high clutch through the orifice 36.

The feed pressure for variable force solenoid VFS3 is line pressure, as seen at 40, which enables the variable force solenoid VFS3 at 32 to distribute controlled flow rates to the high clutch C2 and the intermediate servo release side B2 during 3-4 upshifts. The controlled flow rates entering the intermediate servo release side and the high clutch circuit will guarantee consistent accumulation times (see phase 4 of FIG. 1) regardless of the operation mode of the transmission and regardless of piston servo sizes.

With the CF1 pressure controlled by the variable force solenoid VFS1 seen at 42, which is connected to the intermediate servo apply side, and with VFS3 pressure or VFS3/MOD pressure controlling the input flow to the high clutch and the intermediate servo release circuit, the complete high clutch pressure characteristic can be controlled electronically during the torque phase and the inertia phase of a 3-4 upshift. The slope of the torque phase for this shift can be adjusted depending on the flow rate released from the variable force solenoid 32 into the high clutch and intermediate servo release circuit.

The flow rate will determine the flatness or the steepness of the high clutch torque. This influences the duration of the pressure build-up, the steepness and the flatness. The torque phase, the transition from the torque phase to the inertia phase, and the inertia phase itself can be adjusted by using this additional calibration tool. The torque phase characteristics and the accumulation time can be matched to individual 3-4 upshift requirements, thus enhancing the 3-4 upshift quality.

Figure 2:
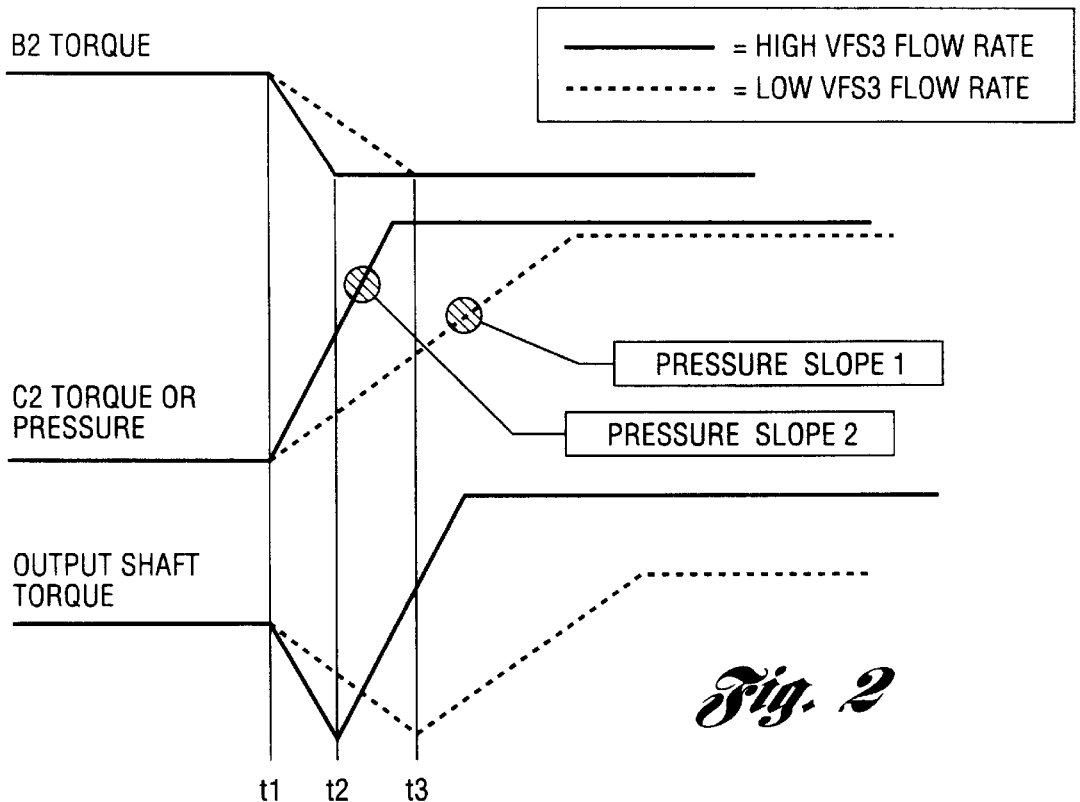
FIG. 2 is a plot illustrating the variation of output shaft torque and high clutch torque or pressure as well as the reaction brake pressure over the shift time interval when the flow rate of VFS3 is varied.

FIG. 2 shows this function in graphic form during the shift interval from t1 to t2 to $t_3$. That is, the pressure on the clutch C2 can be varied as well as the torque of the intermediate servo B2 as the slope of the C2 pressure is changed between pressure slope 2 and pressure slope 1 shown in FIG. 2.

At time t1 in FIG. 2, the high clutch begins to engage, thereby reducing the reaction torque of the intermediate brake band. The initiation of the pressure slope 2 for the high flow rate at variable force solenoid 32 or at the modulator valve 34 begins to increase. At the same time, the reaction torque at B2 is reduced. The output shaft torque signature follows the sum of the negative torque reaction at B2 and the positive high clutch torque at C2.

At time t2, the reaction torque is zero since the high clutch pressure increases rapidly. Pressure slope 2 results in elimination of reaction torque at B2 and the intermediate servo starts to stroke. A rapid increase in high clutch torque then takes place. Both events affect the 3-4 shift quality.

At time t3, the reaction torque slope generated by the high clutch pressure slope 2 is more flat. The duration of the torque phase is increased and the changeover from the torque phase to the inertia phase is smooth due to the flat high clutch pressure increase that is controlled by the lowered flow rate of the variable force solenoid 32 or the modulator valve 34.

In summary, the accumulation time during a 3-4 upshift can be matched to all the required shift times by the flow control of the variable force solenoid (VFS3) shown at 32 and the pressure control of the variable force solenoid (VFS1) shown at 42. Accumulation time is independent of the stroke distance of the intermediate servo. The duration and the characteristic slope of the torque phase can be varied and adjusted to satisfy particular shift requirements. The initiation of the inertia phase of a 3-4 upshift can be adjusted by the pressure slope of the high clutch C2.

Figure 13:
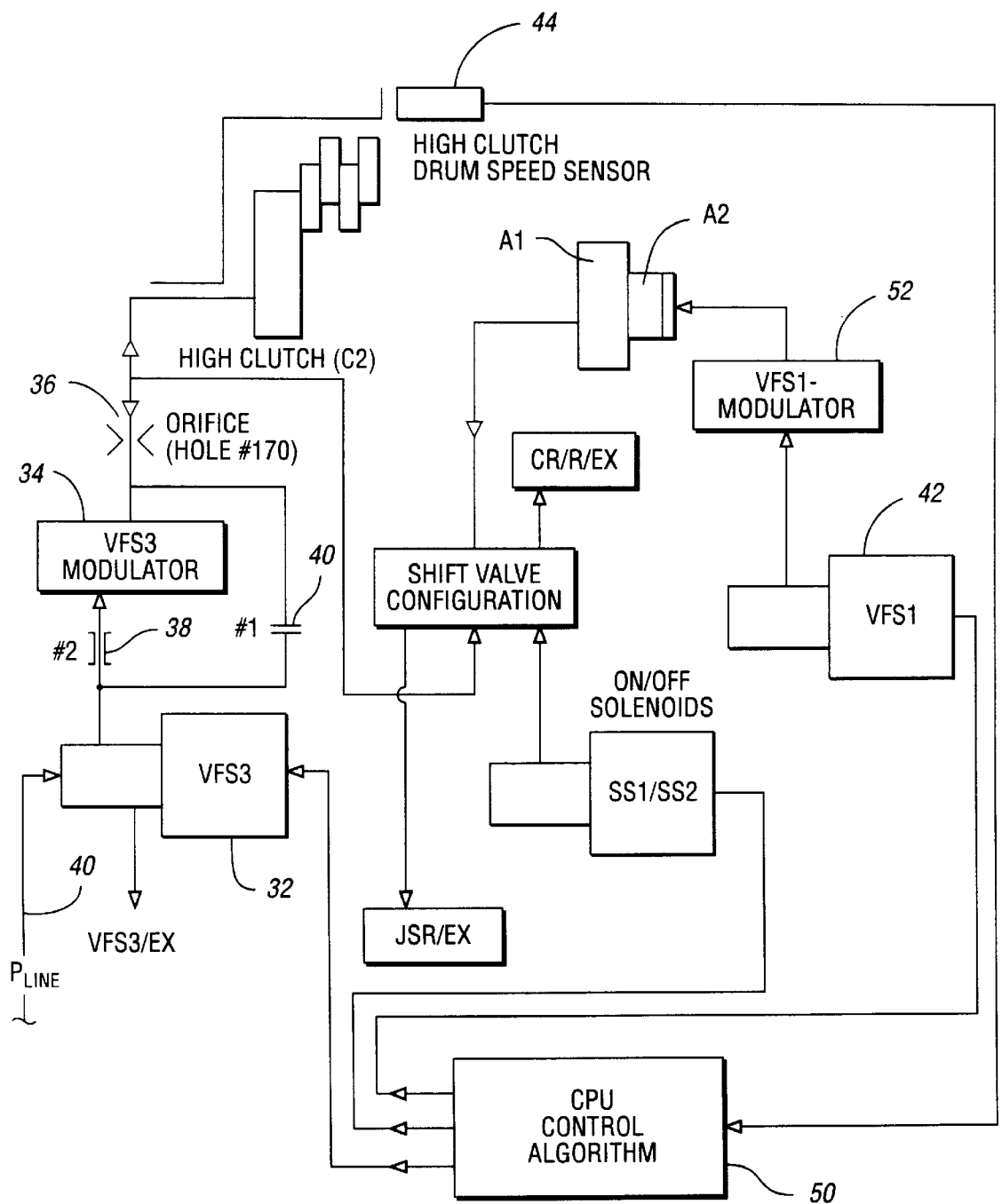
FIG. 13 is a schematic overview of the portions of the control system of the invention that effect a 3-4 upshift and a 4-3 downshift.

The high clutch drum speed sensor is shown in FIGS. 3 and 13 at 44. The turbine speed sensor is shown in FIG. 3 at 46 and the output shaft speed sensor is shown in FIG. 3 at 48. The signal values from the transmission are distributed to a microprocessor controller 50, which has a central processing unit that calculates the derivative of the high clutch drum speed at 110. The central processor unit also uses control algorithms stored in memory to calculate a target value for the high clutch drum speed at 54. A commanded and desired gear also are calculated at 54, as are the clutch and brake band capacities. The derivative of the high clutch drum speed target value is calculated at 56, and a comparison is made between that calculated value and the actual high clutch drum speed determined at 52. If an error exists, a feedback circuit, which includes a proportional integral derivative (PID) controller, establishes feedback information for the variable force solenoids 32 and 42.

The synchronous 4-3 downshift is a drive-to-reaction shift. That is the inverse of the 3-4 upshift previously described. In this case, the high clutch C2 is a drive member. It must have a controlled release in order to accomplish engagement of the intermediate band B2 as a reaction element at zero high clutch drum speed. This synchronization is required in order to avoid an engine overshoot or an engine speed flare-up as well as to provide good shift quality without sudden inertia torque disturbance. This synchronization on a 4-3 downshift requires a closed loop control release of the high clutch C2, independent control of the intermediate servo B2, and a monitoring of the high clutch drum speed. The 4-3 downshift requires also the gradual release of the high clutch in order to avoid large output shaft torque disturbances.

Figure 4:
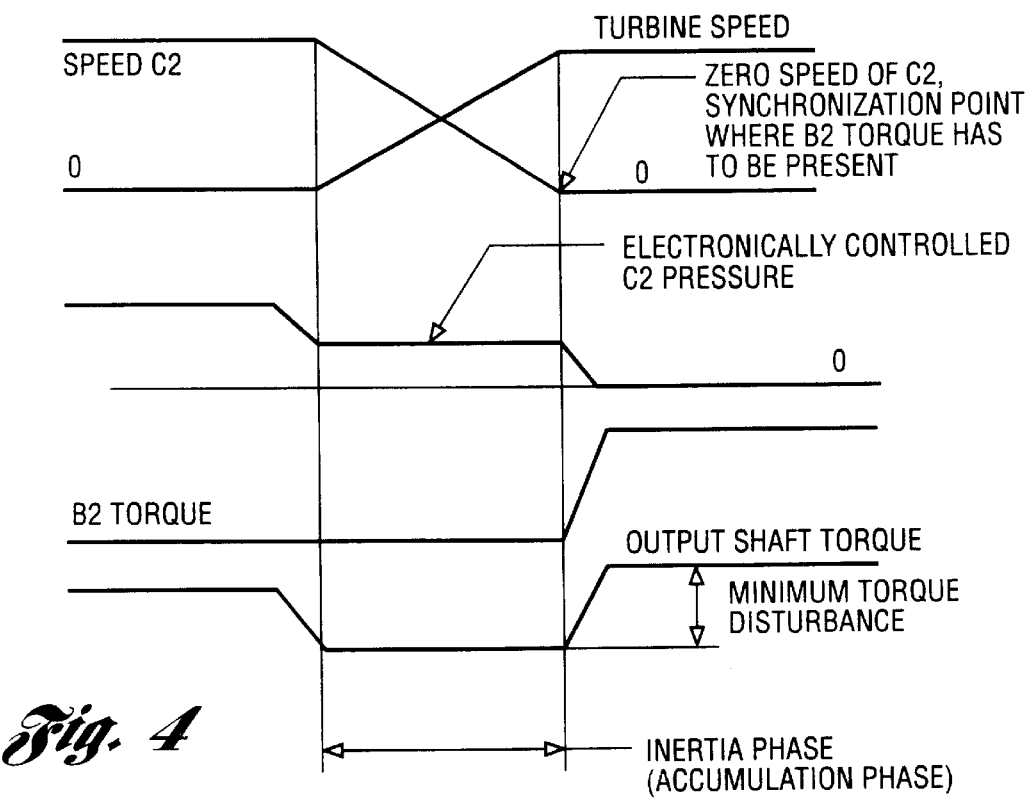
FIG. 4 is a plot of the intermediate speed ratio brake and high clutch pressure during the shift interval on a 3-2 downshift for a transmission of the kind shown in U.S. Pat. No. 5,646,842.
Figure 5:
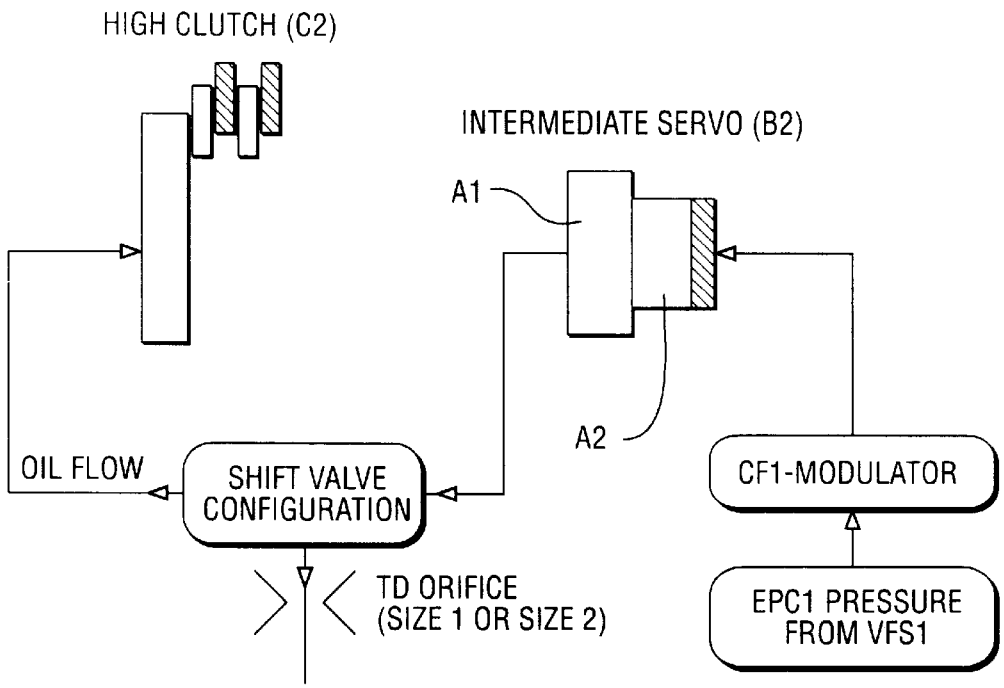
FIG. 5 is a schematic representation of the clutch and brake elements involved in a ratio change between the third ratio and the second ratio for the transmission of the '842 patent.

For an understanding of the 4-3 downshift control for the invention, reference now will be made to FIGS. 4, 5 and 6.

As previously described, the four-speed transmission of U.S. Pat. No. 5,646,842 has a synchronous 3-2 downshift and a synchronous 4-2 downshift. The control system thus has to synchronize the release of the high clutch and the application of the intermediate brake band. The synchronization point is at zero speed of the high clutch drum speed. At that instant, the intermediate brake band must be applied simultaneously with the zero speed point. The pressure profile on the high clutch has to be controlled in order to minimize the output shaft torque disturbance. This is shown in FIG. 4.

Figure 25A:
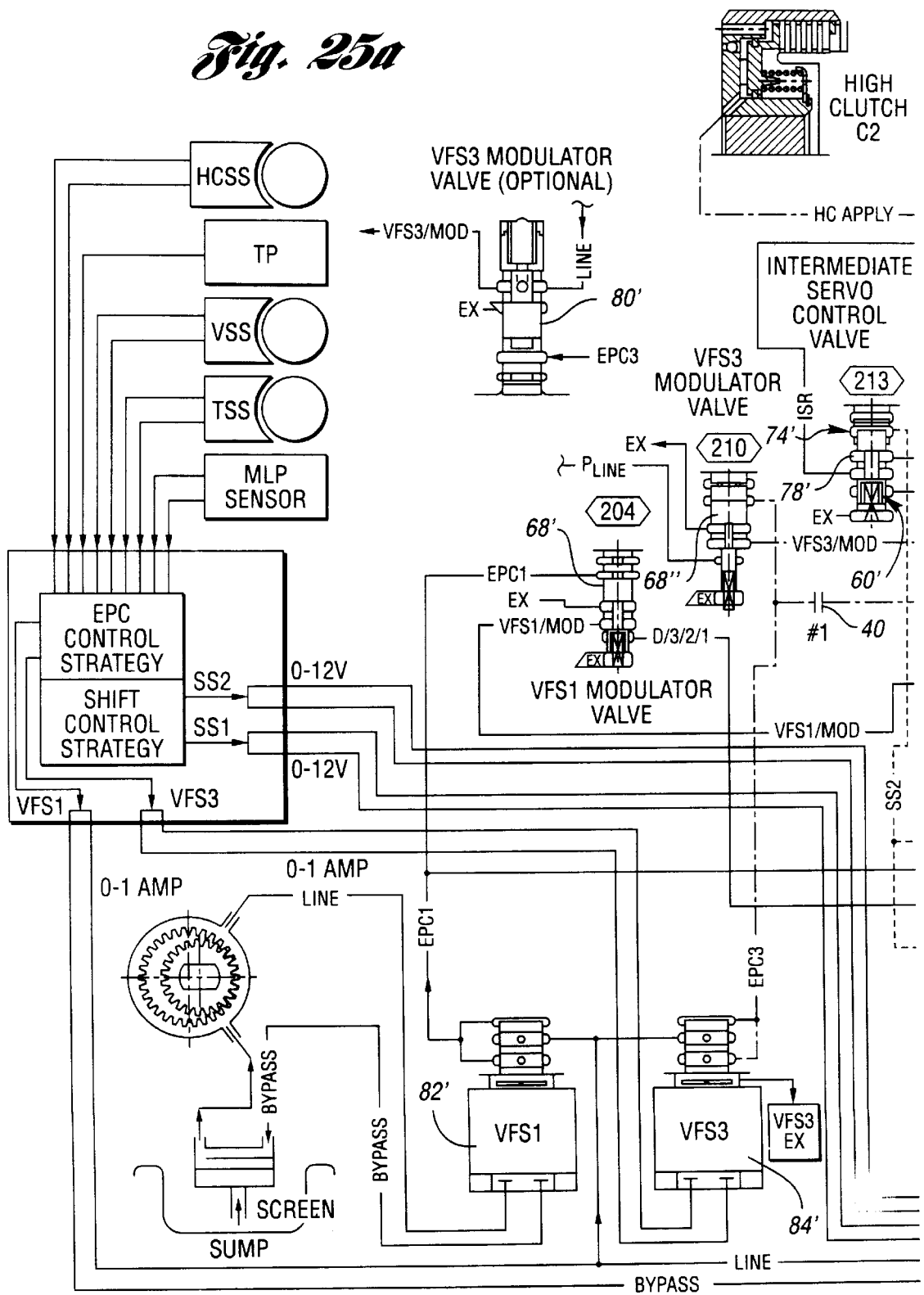

The transmission of the '842 patent has two solenoid stages that effect intermediate steps between the third gear or fourth gear and the final second gear. FIG. 5 shows the first and second intermediate steps on these downshifts. The difference in these two intermediate steps is the selection of two orifices that are controlled by the shift valve configuration. The Figures in the '842 patent that correspond to FIG. 5 are FIGS. 25a and 25b.

FIG. 6 of the present invention corresponds to FIG. 26 of the '842 patent. The two intermediate steps of FIG. 5 are established with shift solenoids SS1, SS2 and SS3 that form a part of the shift valve configuration. The intermediate servo apply pressure is controlled, as previously explained, by the clutch pressure modulator valve (forward) which produces CF pressure, as indicated in FIG. 5.

The pressure in the high clutch and the intermediate servo release circuit is exhausted over the shift valve configuration through two different orifices, identified as holes 100 and 170. The intermediate servo pressure is relied upon to pressurize the oil against the high clutch piston to produce the distinct pressure profile on the high clutch that is indicated in FIG. 6. That pressure profile is produced during the intermediate servo stroke phase and is entirely dependent upon CF1 pressure. That profile serves as an accumulator pressure for the high clutch as well as a synchronization tool for synchronizing both the clutch and the brake. The pressure profile is usually in the form of an electronic pressure control (EPC) ramp, which produces an equivalent pressure characteristic on the high clutch. The interdependence of the EPC pressure and the high clutch pressure is the result of the different amounts of metered oil developed by the different size orifices (holes 100 and 170), and the remaining oil flow is used to control the high clutch during the intermediate servo stroke phase. The pressure applied on the high clutch during a 3-2 downshift is required to hold the engine torque during the stroke phase of the intermediate servo.

With high input torque and low high clutch pressure, capacity loss will take place and the engine speed will flare up. Two different size orifices are chosen in order to cover respectively the high speed shifts and low speed shifts on a 3-2 downshift. The two control orifices are selected by two distinct solenoid stages which are:

| | | | |
|---|---|---|---|
| 2nd gear: | SS1 = ON | SS2 = ON | SS3 = OFF |
| Intermediate step 1: | SS1 = OFF (Orifice 100) | SS2 = ON | SS3 = OFF |
| Intermediate step 2: | SS1 = OFF (Orifice 170) | SS2 = ON | SS3 = ON |
| 3rd gear: | SS1 = OFF | SS2 = OFF | SS3 = OFF |

During a change from third to second ratio, the intermediate steps can be selected individually or both in series if that is required.

FIG. 6 shows a typical pressure profile for the 3-2 downshift previously described with reference to FIGS. 5.

In contrast to the shift described with reference to FIG. 5, the 3-4, 4-3 and 5-3 shifts for the transmission of the present invention can be seen by referring to FIGS. 13 and 3. The downshifts are accomplished by the introduction of variable force solenoid VFS3, shown at 32 in FIG. 13, and by monitoring the high clutch drum speed which, in effect, is a monitoring of the sun gear speed of the Simpson gear set.

Figure 14:
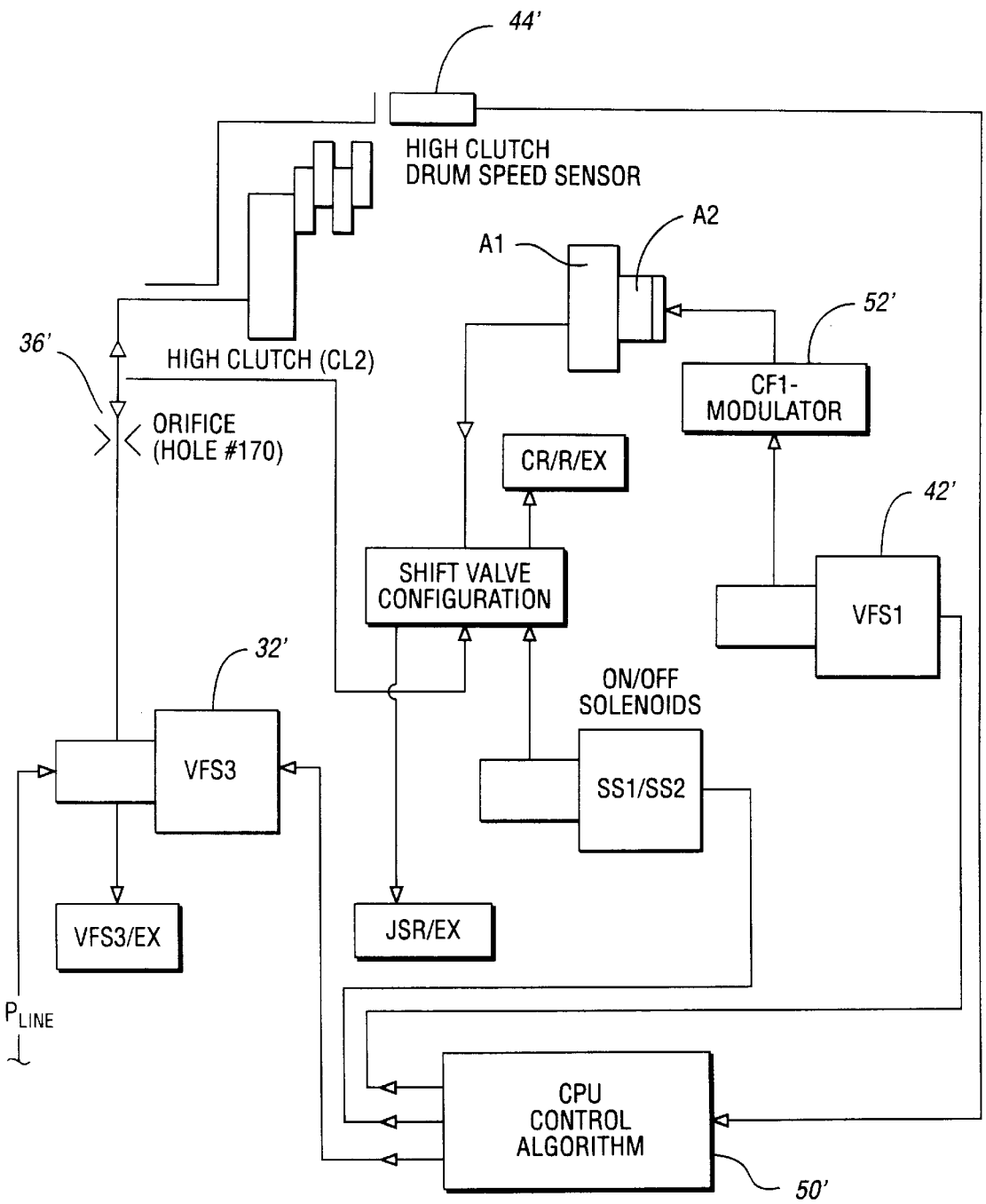
FIG. 14 is an alternative overview comparable to the overview of FIG. 13 showing the elements of the control system that are involved in a 3-4 upshift and a 4-3 downshift.

An alternate version of the schematic diagram shown in FIG. 13 is seen in FIG. 14 where the VFS modulator valve and the orifices 38 and 40 are not included. In the alternate circuit of FIG. 14, similar reference characters are used to identify elements of the circuit that have corresponding elements in the circuit of FIG. 13, although prime notations are added to FIG. 14.

The VFS3 valve is connected to the high clutch in order to accelerate the response time of the system. The VFS pressure in the case of FIG. 14, or the VFS/MOD pressure in the case of FIG. 13, is also connected to the intermediate servo release side with release area A1. The variable force solenoid VFS1, shown at 42 in FIG. 13, controls the VFS1/MOD pressure developed by modulator valve 52, which is connected to the intermediate servo apply side A2. Thus, independent intermediate servo control and independent high clutch control is achieved.

Figure 9:
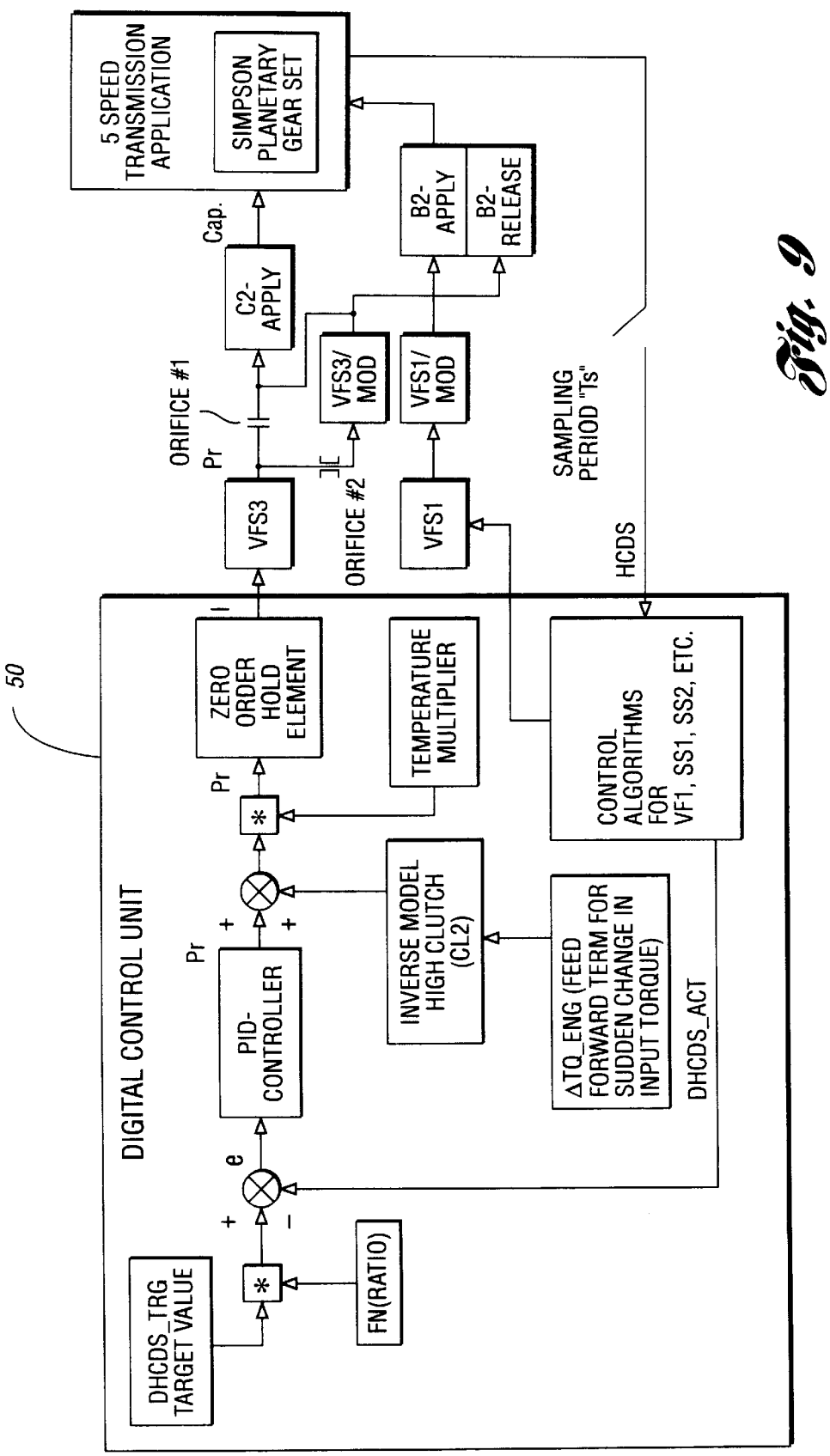
FIG. 9 is a schematic diagram in block diagram form illustrating the elements that are involved in the downshifting of the Simpson gear set during a 4-3 downshift or a 5-3 downshift for the gearing arrangement of the invention.

Closed loop control, as indicated in FIG. 9, can be applied for decelerating the high clutch drum using the high clutch drum speed sensor as a feedback signal. The derivative of the actual value of the high clutch drum speed signal determined by the processor is compared to the target value for the derivative of the high clutch drum speed sensor in establishing the VFS3 pressure. Accurate and robust synchronization between the zero speed state of the high clutch drum and the engagement of the intermediate servo thus is achieved.

FIG. 9 shows the capability for either applying VFS3 directly to C2 or connecting the VFS3/MOD valve between VFS3 and C2 by opening or closing orifice number 1 or orifice number 2, seen in FIG. 9.

Two intermediate steps allow the simultaneous control of the high clutch drum speed and the intermediate servo stroke. This allows the servo to pre-stroke to reduce the stroke time. This is used to effectively achieve high quality shifts at low speed and high torque 4-3 downshifts. It also allows separate control of the high clutch drum speed while leaving the intermediate servo unstroked. In this case, the high clutch and the intermediate servo are disconnected, thus allowing the high clutch to decelerate without allowing the intermediate servo to stroke. This feature can be used to predecelerate the high clutch drum to prevent an early engagement of the intermediate servo. This feature can be used for high speed and low torque 4-3 downshifts.

The two different solenoid states are also used to enhance the failure mode of the system. Two electrical failures (e.g. non-working ON/OFF solenoids or stuck variable force solenoids) then would be necessary to trigger a Simpson planetary gear set tie-up.

The 5-3 downshifts are executed in the same manner as the 4-3 downshifts except that the initiation of the downshift starts from fifth gear, where the high clutch drum has 1.33 times higher speed compared to fourth gear. In this case, the overdrive brake capacity B1 has to be released before starting the control of the high clutch drum speed profile to initiate a 5-3 downshift. Thereafter, the control actions are the same as in the case of a 4-3 downshift.

In summary, the 4-3 and 5-3 downshift control system includes an independent high clutch capacity control relative to the intermediate brake band which is accomplished by the additional variable force solenoid VFS3 controlling the high clutch capacity. This is required in the control of the high clutch drum speed profile and to synchronize zero drum speed with the engagement of intermediate brake B2. Such downshifts require closed loop control of the high clutch drum speed, which introduces a more robust synchronization and high clutch drum speed profile. These downshifts further are characterized by more closely controlled high-speed/low-torque, and high-torque/low-speed 4-3/5-3 downshifts.

Functional Description of the 3-4, 4-3, 5-3 Shift Control System

Figure 19A:
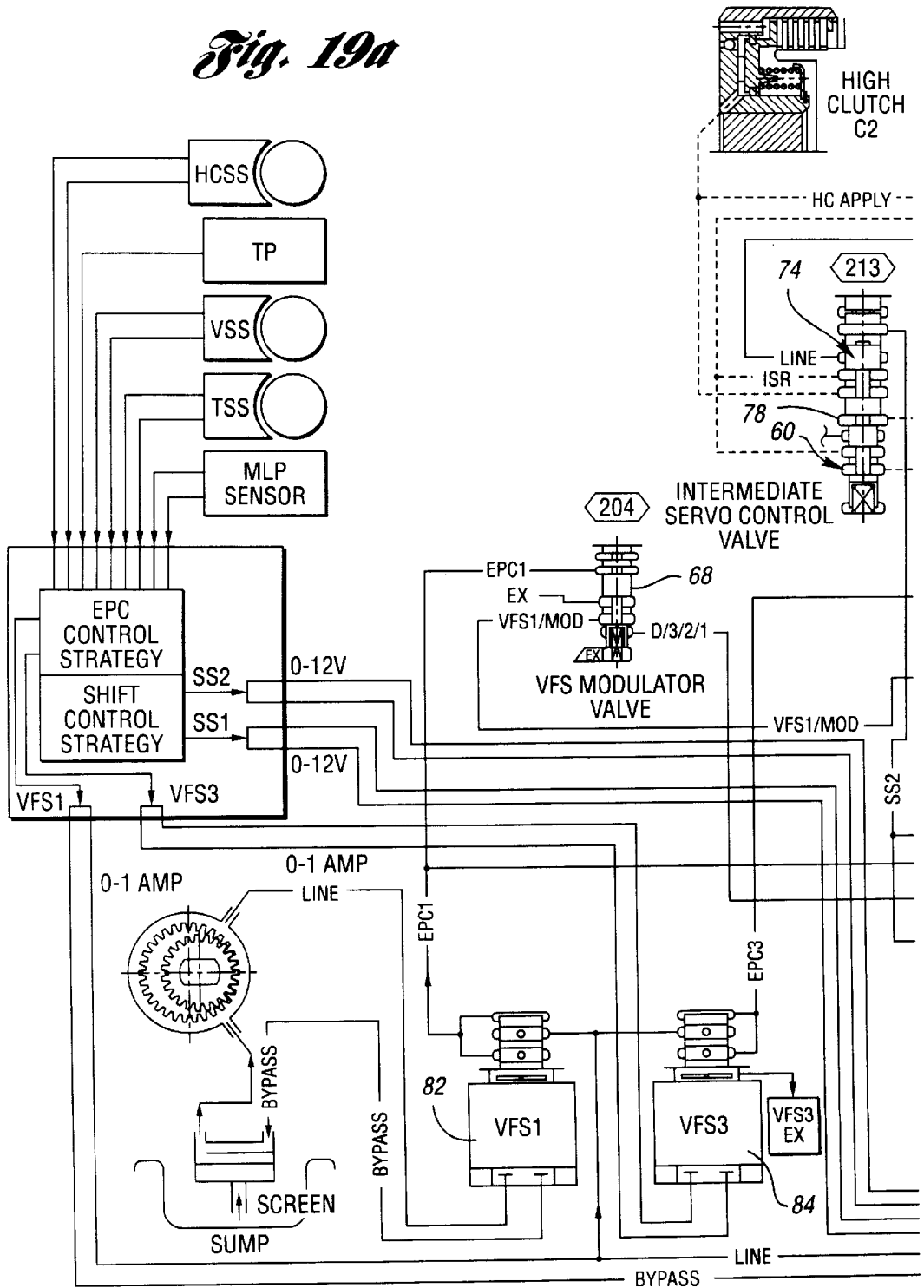
FIGS. 19a and 19b are schematic diagrams of the overall hydraulic electronic control system wherein the valve elements are conditioned for a 4-3 downshift electronic desynchronization and a 3-4 upshift electronic accumulator control with the transmission in third ratio.
Figure 19B:
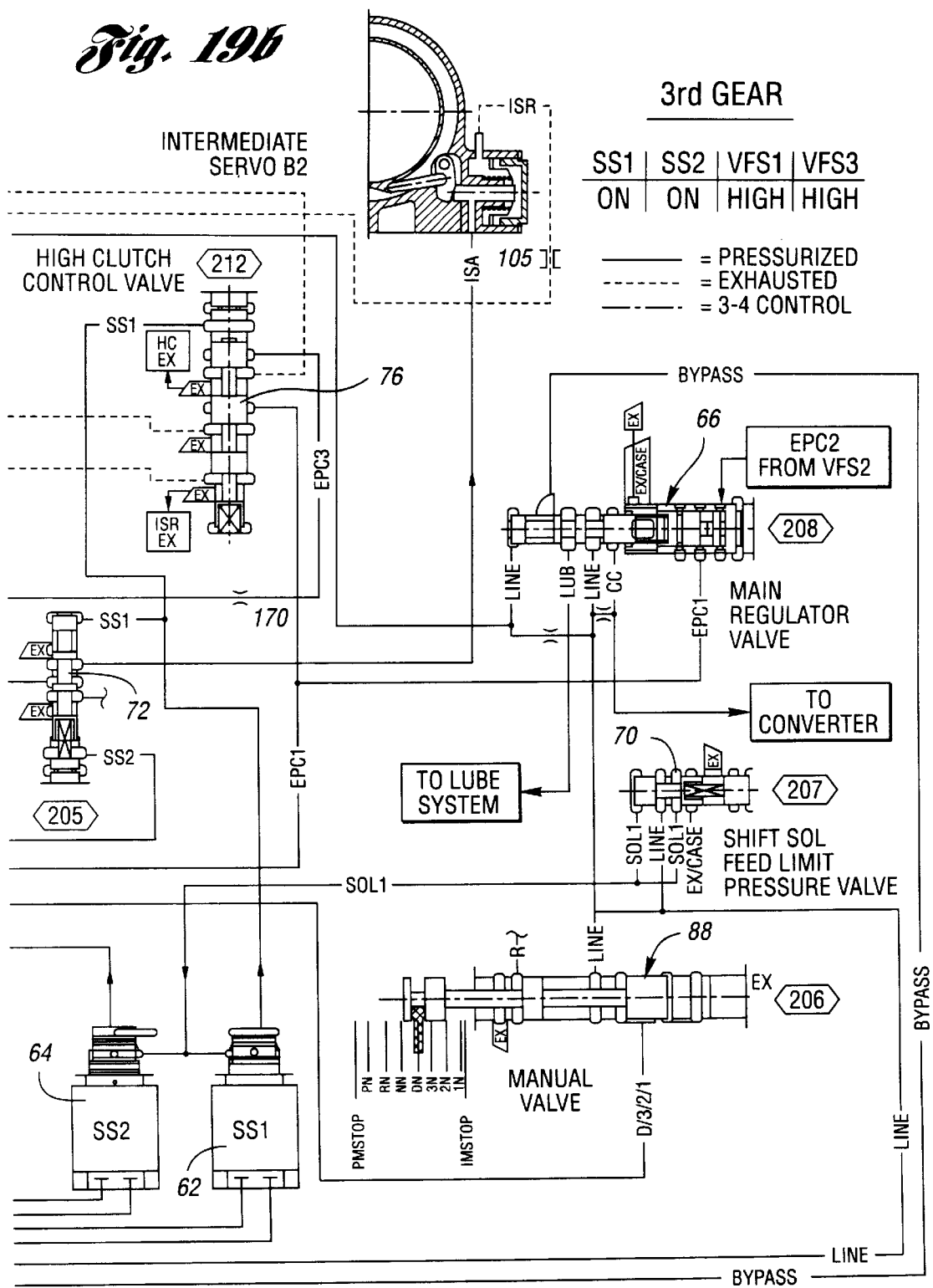
Figure 26A:
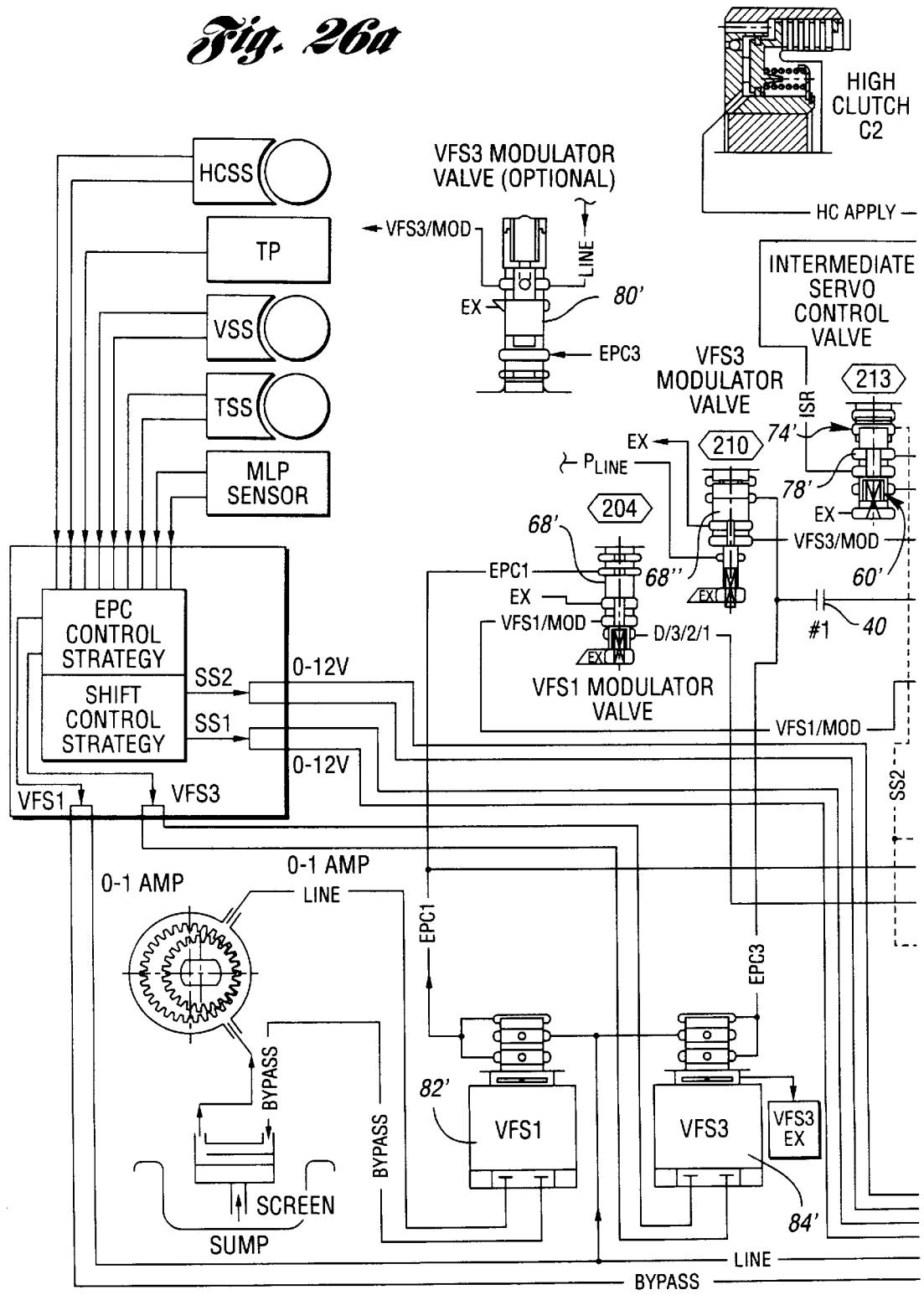

Two different versions of the shift valve configuration for 3-4, 4-3 and 5-3 shifts are shown respectively in FIGS. 19a through 26a and in FIGS. 19b through 26b. The first and second versions for third gear are shown in FIGS. 19a and 19b and in FIGS. 23a and 23b, respectively. The valve positions for intermediate step 1, first version, is shown in FIGS. 20a and 20b. FIGS. 24a and 24b show the second version for the intermediate step 1. FIGS. 21a and 21b show the valve positions for intermediate step 2, first version, and FIGS. 25a and 25b show the valve positions for intermediate step 2, second version. FIGS. 22a and 22b show the fourth gear valve positions, first version, and FIGS. 26a and 26b show the fourth gear valve positions, second version.

In the control system drawings of FIGS. 19a through 26b, prime notations are used to describe the valve elements for the second version. Reference numerals without prime notations are used in these drawings to designate the valve elements for the first version.

FIG. 19b shows two ON/OFF solenoids for shift control at 62 and 64, respectively. The corresponding ON/OFF solenoids for the second version use the same numerals although prime notations are added. These solenoids also carry the notations SS1 and SS2, respectively.

The system includes also one main regulator valve including a booster valve, as shown at 66 for the first version and at 66' for the second version. It also includes two modulator valves VFS1/MOD and VFS3/MOD. VFS1 is shown at 82 for the first version and at 82' for the second version.

Variable force solenoid modulator (VFS3/MOD valve) is not used in the first version. It is identified in the drawings for the second version by reference character 68". The system also has one solenoid pressure regulator valve shown at 70 and 70' for the first and second versions, respectively. It also has three shift valves as shown at 72, 74 and 76 in the case of the first version and at 72', 74' and 76' in the case of the second version. The two variable force solenoid valves VFS1 and VFS3, previously discussed, actuate the two modulator valves.

The differences in the two versions reside in the intermediate servo control valve at 74 and 74' and the high clutch shift control valve 76 and 76', as well as the additional VFS/MOD valve 68" for the second version.

Figure 24B:
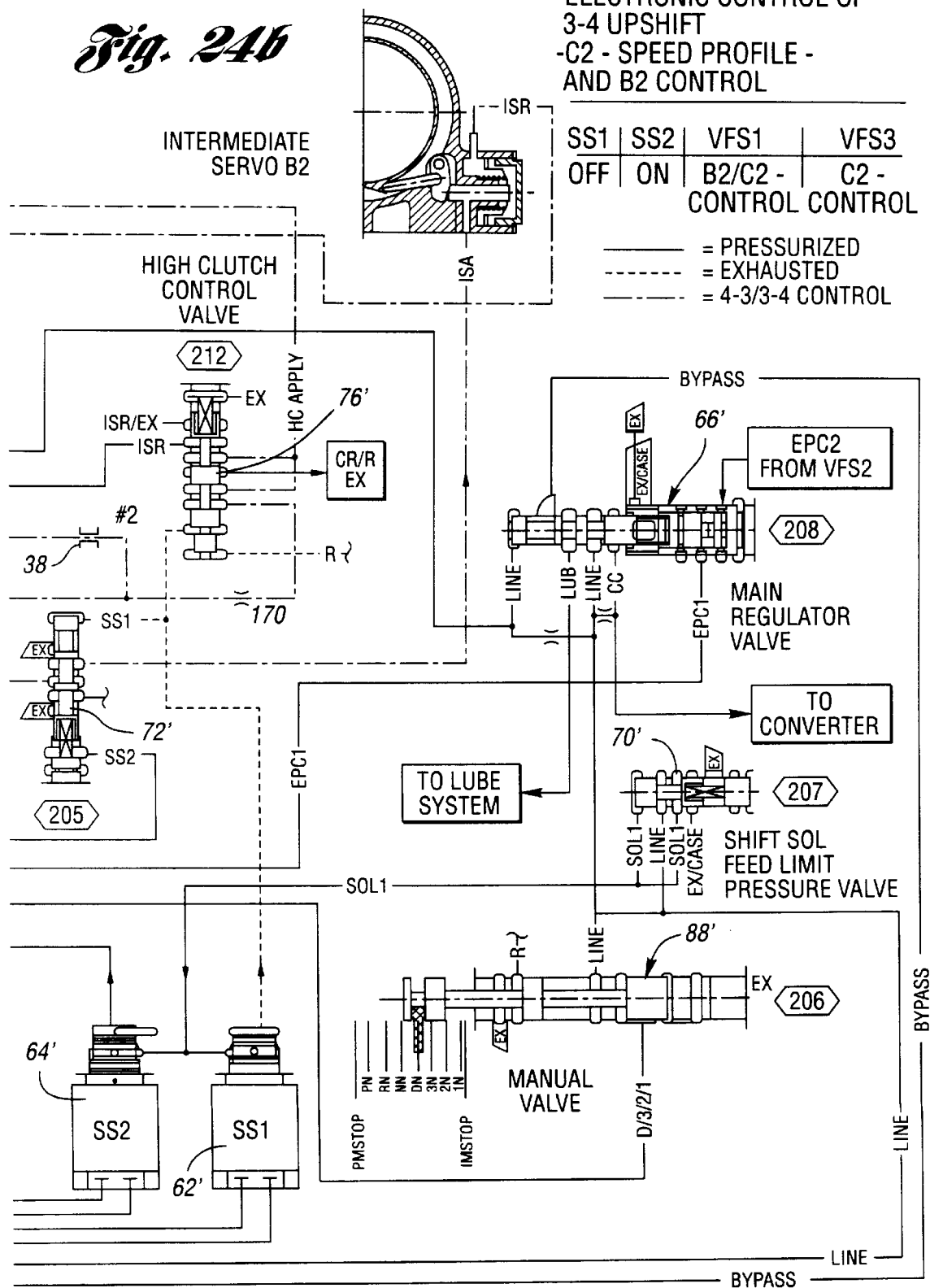

The second version has separate exhaust ports for the intermediate servo release side, which is identified as ISR/EX in FIG. 24b next to valve 76'. In the first version, the exhaust port for the intermediate servo and the high clutch is common and is located at the shift valve 76. The high clutch exhaust port is shown in FIG. 19b, but a corresponding port does not appear in FIG. 24b for the second version.

The first version has a differential area 78 on shift valve 74 in FIG. 19a where an electronically controlled pressure EPCL is applied. This pressure EPC1 interlocks the shift valve 74 when a 3-4 upshift is complete. FIG. 24a for the second version has an additional valve VFS3/MOD valve in front of the variable force solenoid VFS3. Either VFS3 or VFS3/MOD pressure can be connected to the high clutch C2 and the intermediate servo release by the orifices 1 and 2 shown in FIGS. 23a and 23b, respectively, and identified by reference numerals 40 and 38, respectively, as previously indicated in FIG. 13.

Figure 23A:
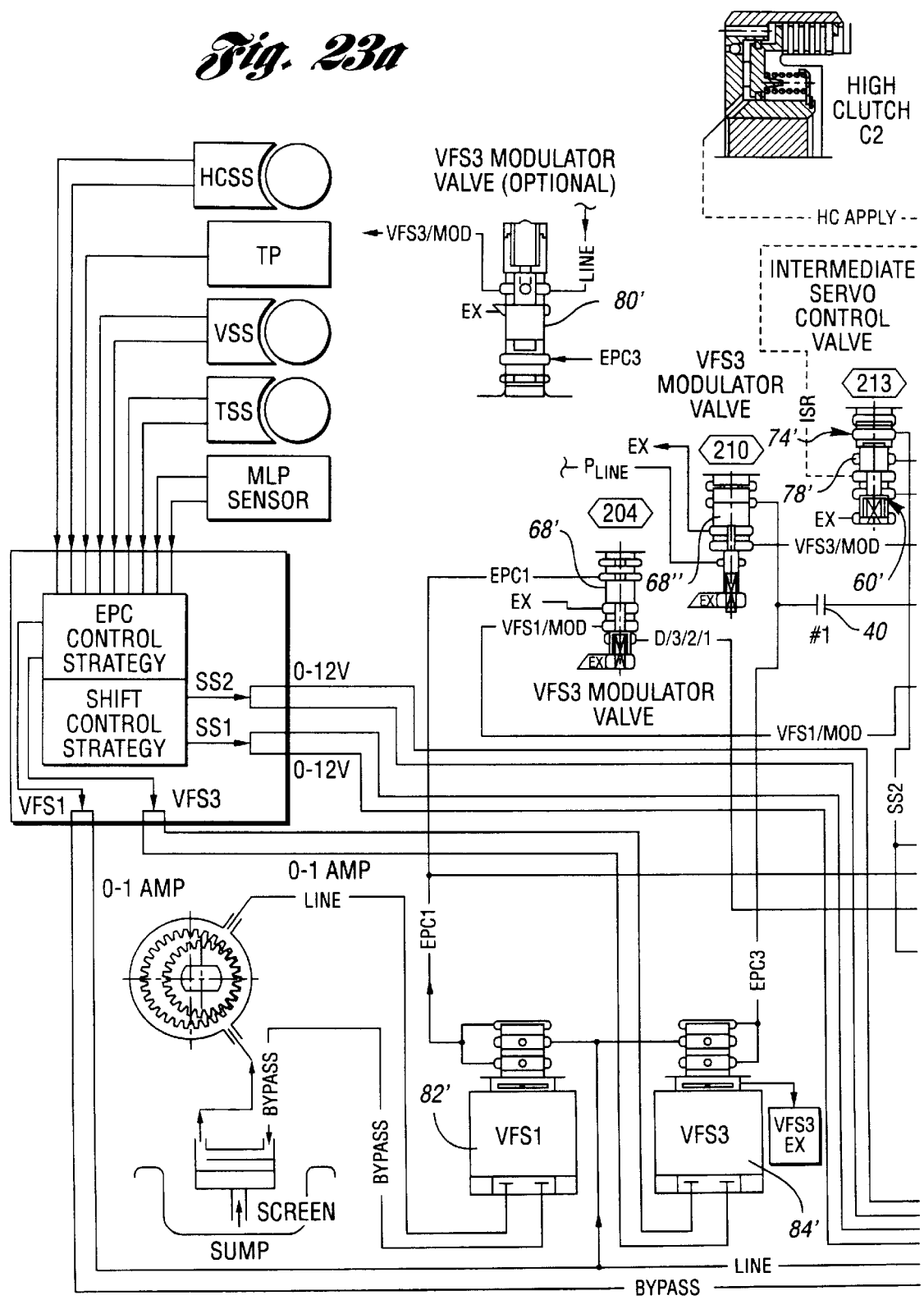
FIGS. 23a and 23b are control system diagrams corresponding to FIGS. 22a and 22b wherein the valve elements are positioned for third ratio operation.
Figure 23B:
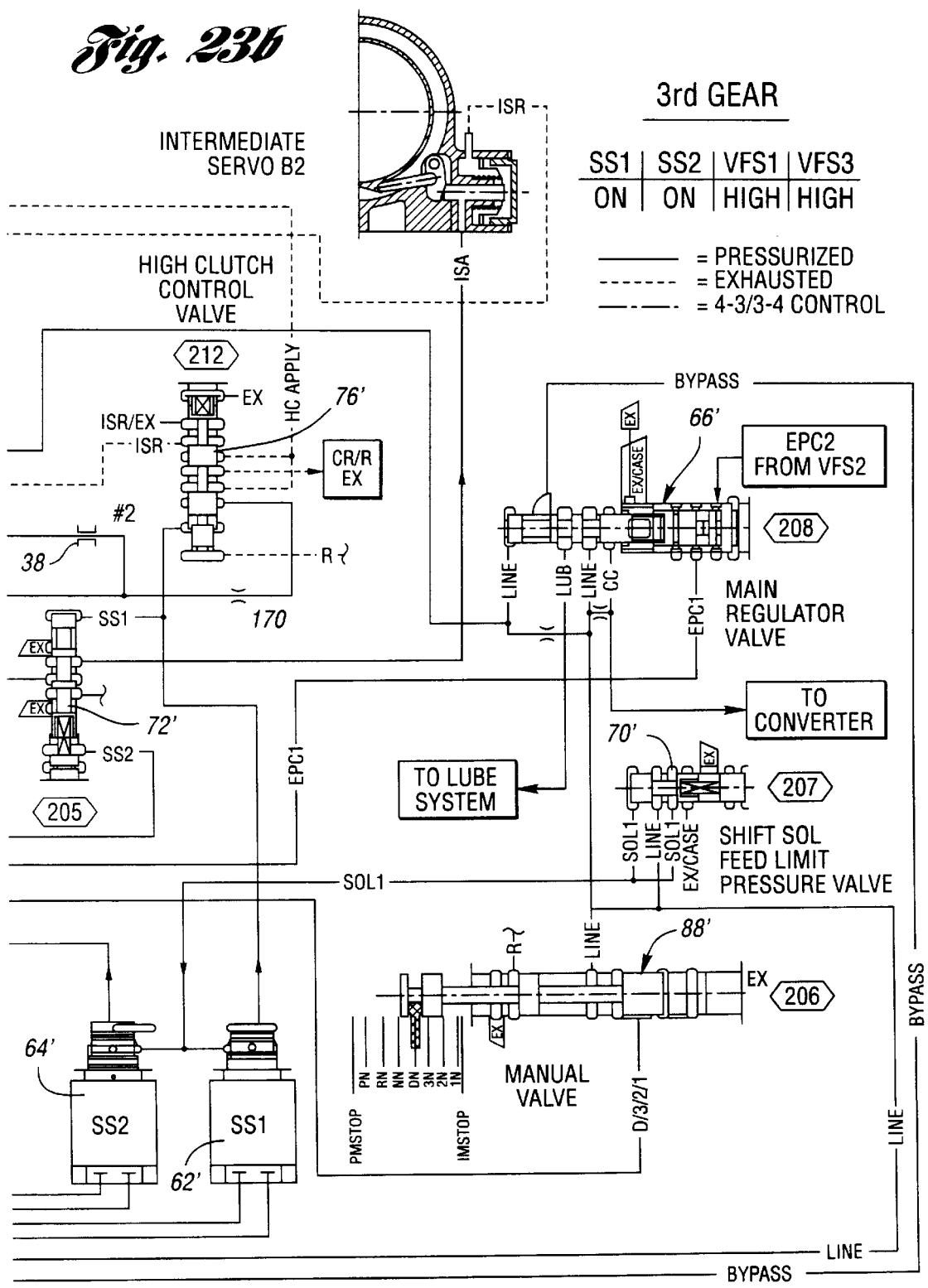

One version of the VFS3/MOD valve is shown in FIGS. 23a through 26a at 68" for the second control version. This modulator valve version has a differential area that multiplies VFSS/MOD pressure relative to EPC3 pressure. This feature adjusts the clutch capacity in order to meet the requirements of different engine sizes. As seen in FIG. 23a, for example, the VFS3/MOD valve X, 80' X, has one diameter. EPC3 pressure is applied to the top and VFS3/MOD pressure is applied to the back. The transfer function of the valve is as follows:

$$VFS3/MOD = EPC3 - SpringForce/ValveArea$$

The pressure build-up system includes two variable force solenoids, shown at 82 and 84 in FIG. 19a. It includes also two clutch pressure modulator valves previously described with reference to FIG. 23a to enhance the independent capacity control of intermediate servo B2 and high clutch C2. The electronic pressure control system also includes two variable force solenoids 82 and 84 for controlling B2 and C2, respectively.

The hydraulic control system elements that control the 3-4 upshift are shown in FIGS. 19a and 19b, 23a and 23b, FIG. 20a and 20b, FIG. 24a and 24b, FIG. 22a and 22b, and FIG. 26a and 26b. The solenoid stages that are needed to execute a 3-4 upshift are shown in the following table along with the pressures applied on each affected element during the transition from third gear to fourth gear. Intermediate step 1 is introduced, which initiates the upshifting event of the Simpson planetary gear set.

| 3-4 Upshift System Hydraulic Control System | | | | | |
|---|---|---|---|---|---|
| Gear | SS1 | SS2 | CL2 | B2-Release | B2-Apply |
| 3rd | ON | ON | | | ▓ |
| Intermediate Step 1 (IS1) | OFF | ON | ■ | ■ | ▓ |
| 4th | OFF | OFF | ■ | PLINE | ▓ |

Shaded Area = VFS1/MOD controlled;
Light Area = Not pressurized;
Black Area = Controlled by VFS3 resp. VFS3/MOD and VFS1/MOD.

The 3-4 upshift is a synchronous upshift where the high clutch C2 is engaged and the intermediate brake band B2 is released. Synchronization takes place between the ring gear and the stationary sun gear of the first planetary gear unit for the Simpson gear set. The stationary sun gear is released by brake B2 at the same time clutch CL2 is engaging and accelerating the sun gear up to the input shaft speed. The sun gear, the ring gear, and the carrier rotate with input shaft speed. If this synchronization is not accomplished, capacity loss and engine speed flare-up may occur.

The capacity of the high clutch is designed for holding the maximum capacity in reverse. In this case, the high clutch carries 1*input shaft torque. In fourth gear or during a 3-4 upshift, the high clutch carries only a fraction of the input shaft torque depending on the gear ratio. In order to compensate for this over capacity on a 3-4 upshift, the intermediate servo stroke volume is used to accumulate the high clutch capacity.

Detailed Explanation of Valve Functions

In third gear, solenoid 62 (SS1) and solenoid 64 (SS2) are turned on. This solenoid stage is shown in FIG. 19b and in FIG. 23b. When shift solenoid 62 is turned on, the high clutch control valve 76 and the intermediate servo control valve 74 are in the upshift position. For the second version of the control system, the intermediate servo release pressure chamber is exhausted over the ISR/EX port in the shift valve 76'. The high clutch is exhausted separately into the CR/R/EX circuit shown at 76' in FIG. 23b.

In the first version of the control system, the intermediate servo release pressure chamber and the high clutch are commonly exhausted into the HC/EX port over the high clutch control valve 76 seen in FIG. 19b. The shift valve 72 is in the downshift position. It then connects the VFS1/MOD valve 68 to the intermediate servo apply side, thus building up the intermediate band capacity for third gear operation.

Figure 15:
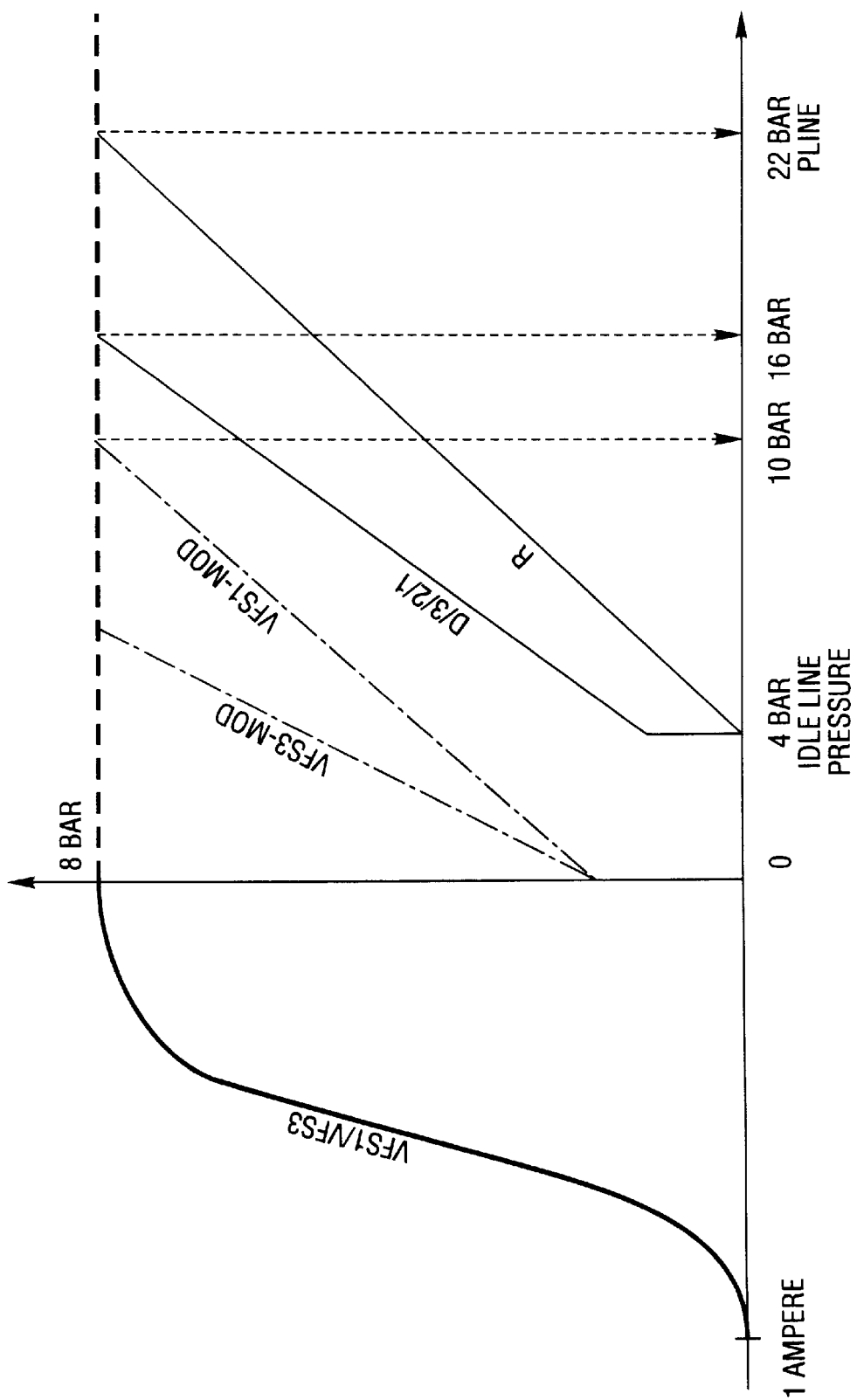
FIG. 15 shows the pressure build-up characteristics for the variable force solenoids that effect a pressure build-up in the pressure supply circuit for the high clutch and the intermediate servo.

The VFS1/MOD valve 68 communicates with line pressure (D/3/2/1). That pressure is the same as the line pressure distributed by the manual valve 88 to the VFS1 modulator valve 68. The VFS1/MOD pressure applied to the intermediate servo apply side is a modulated clutch pressure characteristic of the line pressure (D/3/2/1) and the VFS1/MOD pressure, as shown in FIG. 15 where these pressures are plotted against various values for line pressure. The major advantage of using the VFS1 modulator valve is that the intermediate brake band capacity as well as the high clutch capacity, during a 3-4 upshift can be varied from zero pressure to a pressure that satisfies the maximum capacity requirements.

Figure 20A:
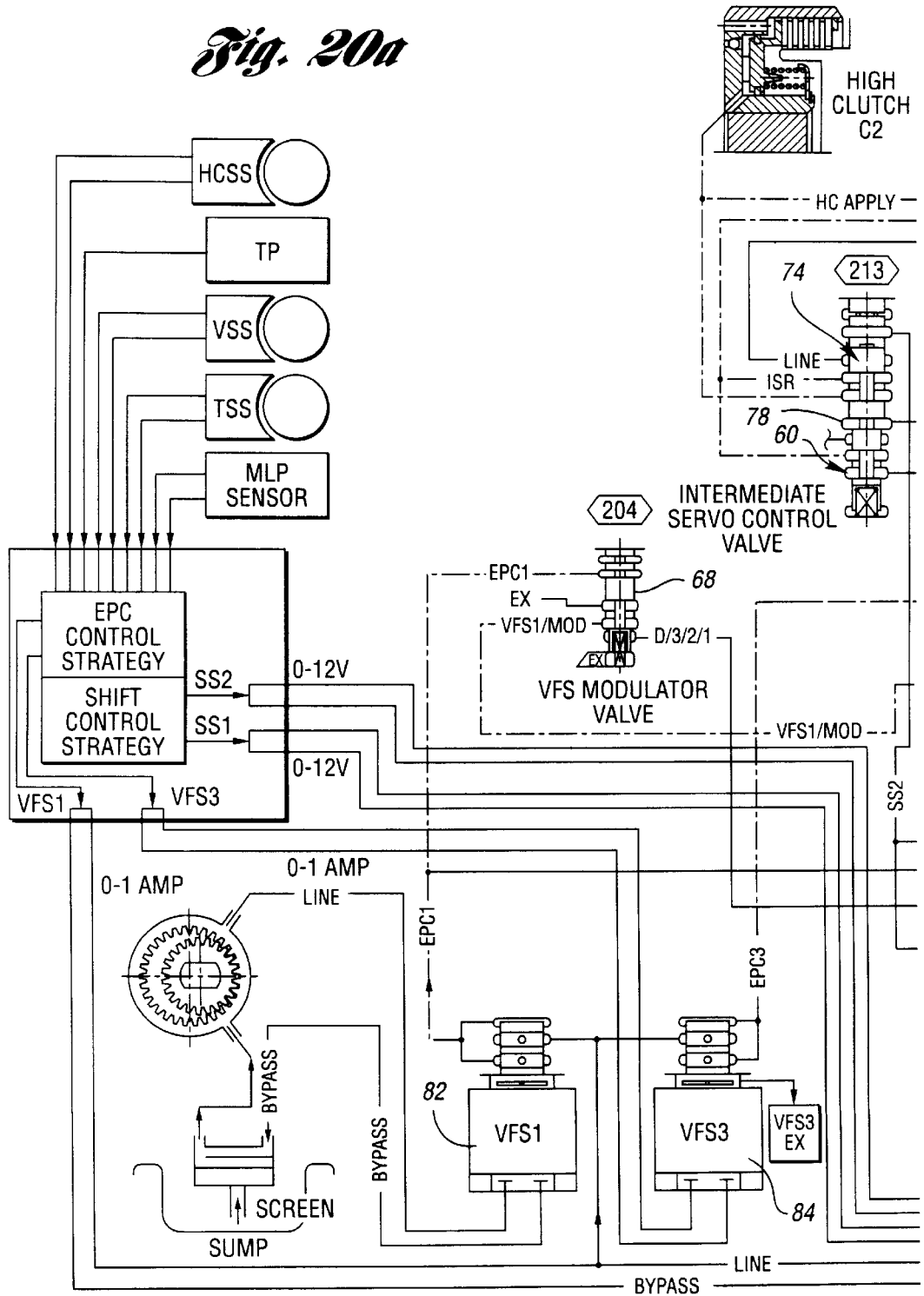
FIGS. 20a and 20b are schematic valve diagrams of the overall control system corresponding to FIGS. 19a and 19b with the valve elements conditioned for intermediate step 1 on a 4-3 ratio change and a 3-4 ratio change.

The intermediate step 1 on a 3-4 upshift now will be described. When SS1 is turned off, the high clutch control valve 76 is downshifted. This is shown in FIGS. 20a/20b and FIGS. 24a/24b. This connects either EPC3 pressure, which is produced by variable force solenoid 84, or VFS3/MOD pressure to the high clutch and to the intermediate servo release chamber over the intermediate servo control valve 74.

Both circuits first are filled. After filling, the high clutch is stroked up to the high clutch engagement point by compressing the high clutch disks. The high clutch pressure and the capacity thus increase. The same pressure is applied on the intermediate servo release side. The torque phase of the 3-4 upshift then is initiated. Line pressure is distributed to the variable force solenoid 84 and to the VFS3/MOD valve of FIG. 24a, which enables the variable force solenoid or the VFS3/MOD valve to produce variable flow rates by adjusting variable differential pressures ΔP across the VFS3 84 or 84' or the VFS3/MOD valve 68". Variable flow rates can now be used to produce various capacity slopes for the high clutch, thereby influencing the shift quality accordingly.

The torque phase characteristic can be adjusted to various shifts during various operating modes. At the point when the release force on the intermediate servo apply side is in equilibrium with the apply force on the intermediate band, the intermediate servo starts to stroke. This is the point where the high clutch transmits full torque and the reaction torque on intermediate servo B2 is zero. At that time, the inertia phase is initiated. The variable flow rate for the variable force solenoid 3, shown at 84, or the flow rate from the VFS3/MOD valve 68" of FIG. 24a is now used to control the stroke time of the intermediate servo. Depending on the adjusted flow rates, the accumulation time can be increased or decreased for a given operating mode for the transmission. The pressure level is determined by the following equation:

$$PHC = (VFS1/MOD * A2)/A1 - F_{sis}/A1$$

where:

PHC=High clutch pressure;

VFS1/MOD=VFS1 controlled intermediate servo apply pressure;

$F_{sis}$=Intermediate servo release spring load;

A1=Release area of intermediate servo; and

A2=Apply area of intermediate servo.

When the intermediate servo is grounded, EPC3 pressure, or VFS3/MOD pressure, can then be used to control the high clutch pressure. At this point, EPCL pressure from variable force solenoid 82 is lowered and EPC3 pressure or VFS3/MOD pressure is adjusted to the required high clutch capacity to complete the 3-4 upshift. The transmission then is in fourth gear. This makes it possible to control the inertia phase of the 3-4 upshift independently of the intermediate servo stroke distance. This increases the robustness of the 3-4 shift quality. Degrading of the 3-4 upshift quality by a grounded intermediate servo prior to completion of the shift is prevented in this way.

Figure 22A:
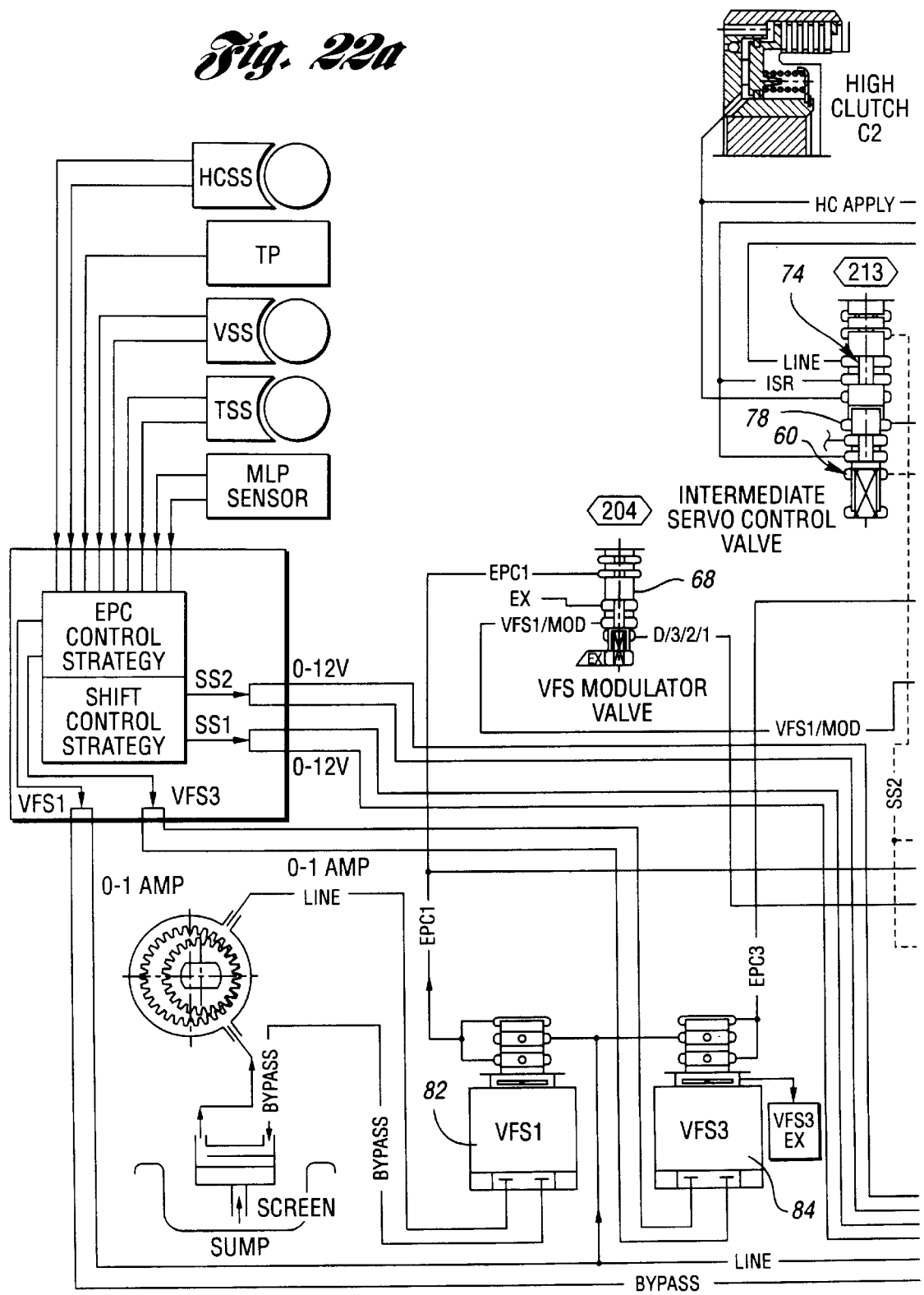
FIG. 22a and 22b are schematic diagrams of the control valve system with the elements of the valve system positioned for fourth ratio operation.
Figure 22B:
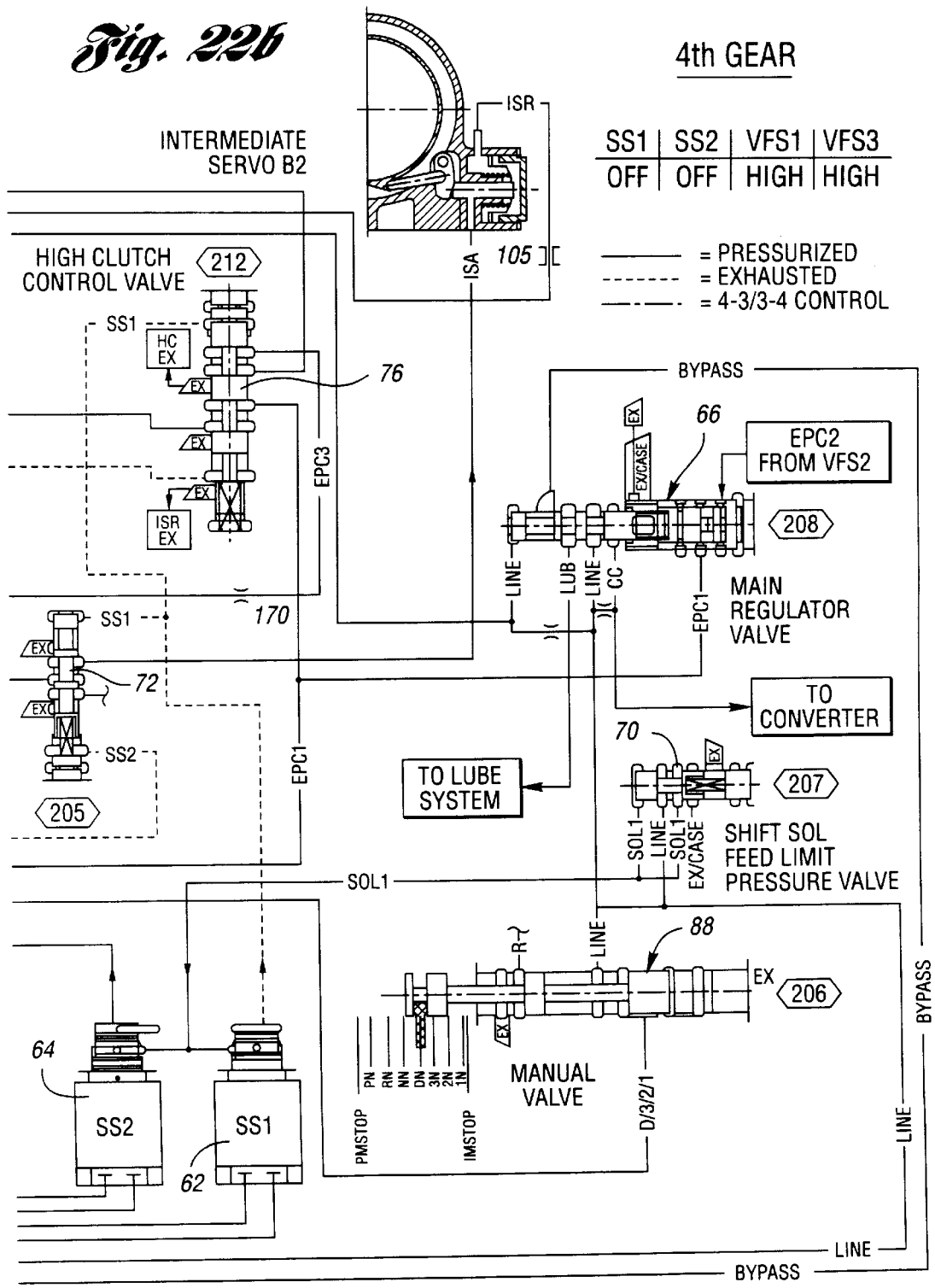

In fourth gear, the solenoid states are as shown in FIGS. 22b or 26b. In this case, both shift solenoids are turned off. The 3-4 upshift is complete in the intermediate step 1. The intermediate servo control valve 74 is downshifted. This connects line pressure to the intermediate servo release side. This is required in order to prevent the intermediate servo from stroking when high VFS1/MOD pressure on the intermediate servo apply side and low EPC3 pressure or VFS3/ MOD pressure are commanded. In this way, simultaneous engagement of the intermediate brake band and the high clutch is prevented. Tie-up of the Simpson gear set thus is avoided.

By embodying the 3-4 upshift control into a solenoid stage called intermediate step 1, two electrical or mechanical failures (for example a stuck SS1 valve plus a stuck VFS3 valve) must occur in order to trigger a tie-up of the Simpson planetary gear set. A further design feature of the transmission of the invention is the ability to default into fourth gear in case of a power loss. In these circumstances, the fourth gear solenoid stage is fixed with all solenoids turned off.

Figure 16:
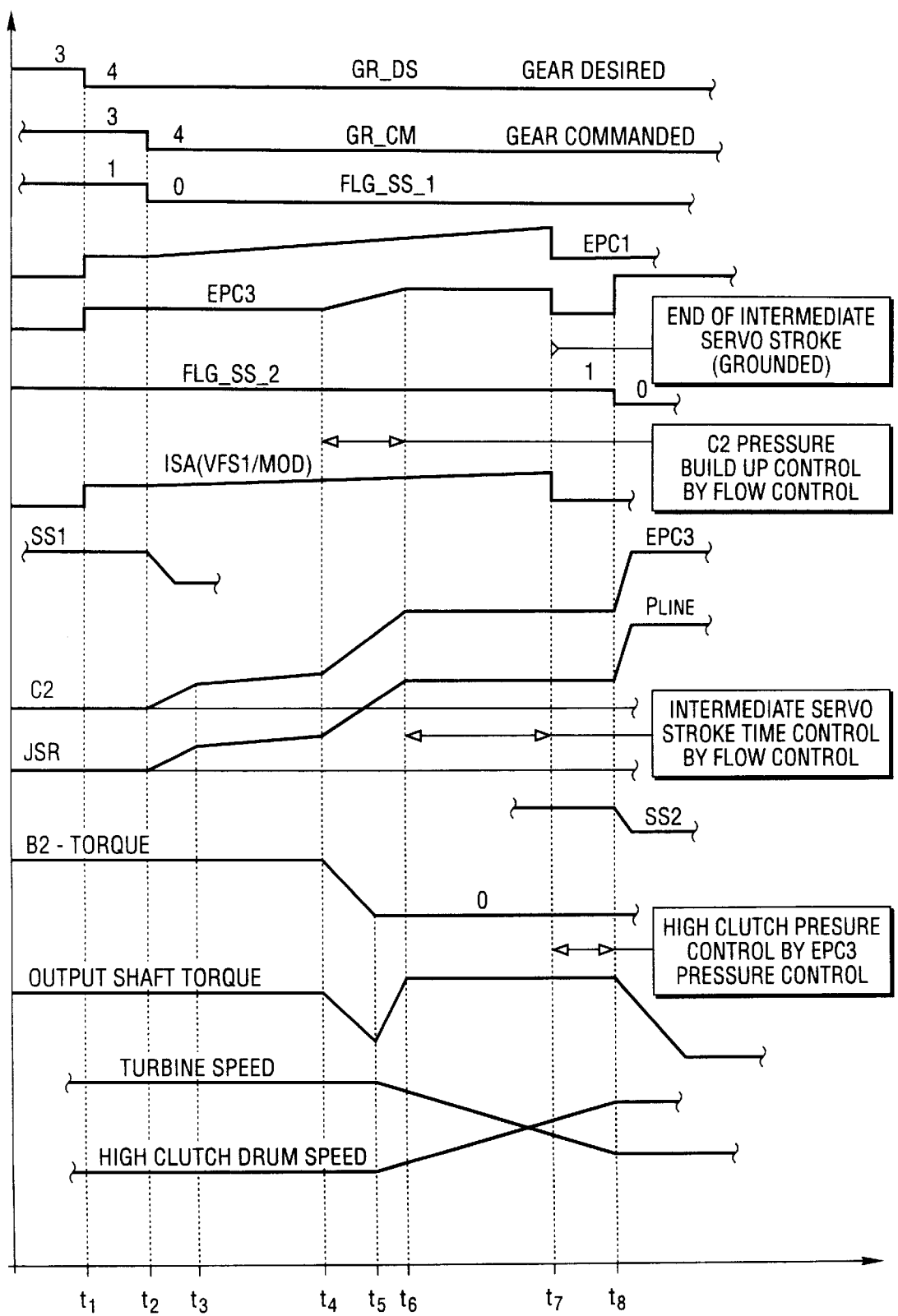
FIG. 16 is a timing diagram showing the variations in pressures, turbine speed, output shaft torque, and gear shift command signals that take place during a 3-4 upshift interval.

Reference now will be made to FIG. 16 which is a timing chart for a 3-4 upshift event. The symbols that appear in FIG. 16 are identified in the following table:

Control Strateay:

GR_DS desired gear

GR_CM commanded gear

EPC1 control pressure register

FLG_SS_1 shift solenoid flag 1

FLG_SS_2 shift solenoid flag 2

NT turbine speed

HCDS high clutch drum speed

DHCDS derivative of high clutch drum speed

Hydraulic and Transmission Parameters:

SS1 shift solenoid pressure 1

SS2 shift solenoid pressure 2

ISA intermediate servo apply pressure

ISR intermediate servo release pressure

C2 high clutch pressure or high clutch torque

B2 intermediate band brake torque

Output shaft torque

At time t1, the driver indicates that he desires a 3-4 upshift, which is triggered by functions of throttle position versus vehicle speed. The GR_DS register is changed from 4 and the shift verification timer TM_VER_SFT is loaded. The EPC1 pressure is set to satisfy static intermediate band capacity and the capacity for a dynamic 3-4 upshift. The EPC3 pressure value or the VFS3/MOD pressure value is set to fill the intermediate servo release and high clutch chambers and to control the high clutch stroke times.

At time t1, the VFS1/MOD pressure rises due to the desired EPC1 pressure value. The EPC3 pressure value increases as discussed previously.

At time t2, the shift verification timer TM_VER_SFT is expired and the gear commanded register GR_CM is changed to 4. At this point, shift solenoid flag FLG_SS_1 is set to zero. An EPCL pressure ramp is started.

At t2, the shift solenoid 1 is deenergized and the high clutch control valve in bore 212 moves into downshift position. This connects EPC3 or VFS3/MOD pressure to the high clutch and the intermediate servo release side. The filling process starts.

At t3, the high clutch starts to stroke.

At t4, the EPC3 values are set to control the flow rates entering the high clutch and intermediate servo release side in an open loop controlled manner.

The high clutch and the intermediate servo release pressure increase. The high clutch starts to transmit torque. At the same time, the intermediate brake torque is reduced by the increased intermediate servo release pressure. The slope of the high clutch pressure characteristic is controlled by the EPC3 pressure settings or by the VFS3/MOD pressure settings.

At t5, the B2 reaction torque is zero. The torque phase of the shift is complete. The output shaft torque signature is now proportional to the high clutch capacity slope. The inertia phase is initiated.

At t6, the EPC3 ramp is completed. The EPC3 pressure level is set to control the stroke time of the intermediate servo.

The high clutch pressure is now in equilibrium with the intermediate servo apply pressure and the intermediate servo starts to stroke. The pressure level of the high clutch and the intermediate servo is determined by the equation PHC= (VFS1/MOD*A2)/A1–$F_{sis}$/A1, which was previously discussed. The EPC3 or VFS3/MOD flow rates control the stroke time of the intermediate servo. In the time range from t4 through t6, EPC3 flow control or VFS3/MOD flow control determines the torque phase characteristic and the change over characteristic from the torque phase to the inertia phase.

At t7, the EPC3 pressure level is set to satisfy high clutch capacity since the intermediate servo stroke phase is ending. This control action is only necessary when the servo stroke is too short to cover the inertia phase of the shift. EPC1 pressure is lowered to prevent a restroking of the intermediate servo.

The EPC3 pressure settings are set to effect high clutch capacity. The accumulation phase generated by the intermediate servo stroke volume is complete since the intermediate servo is grounded. From t6 through t7, the accumulation time is controlled by EPC3 flow control or by VFS3/MOD flow control.

At t8, the EPC3 pressure level is set to a safe value since the 3-4 upshift is now complete. The shift solenoid 2 is deenergized by setting FLG_SS_2 to zero.

When the 3-4 upshift is complete, the shift solenoid 2 is deenergized, which moves the intermediate servo control valve into downshift position. This connects line pressure to the intermediate servo release side preventing the servo from restroking. From t7 through t8, high clutch capacity control is executed by EPC3 pressure control or by VFS3/MOD pressure control. EPC3 pressure control independent of VFS1/MOD pressure is only possible when the intermediate servo is grounded.

In summary, the control system of the invention uses an additional solenoid VFS3 in front of the flow control orifice instead of applying line pressure directly to the clutch and the brake. This allows a control of flow rates entering the intermediate servo release chamber and the high clutch pressure chamber by adjusting independently controlled delta pressures. The accumulation time can be influenced during the stroke phase and the high clutch capacity can be directly controlled by the additional variable force solenoid valve when the servo is grounded.

Figure 7:
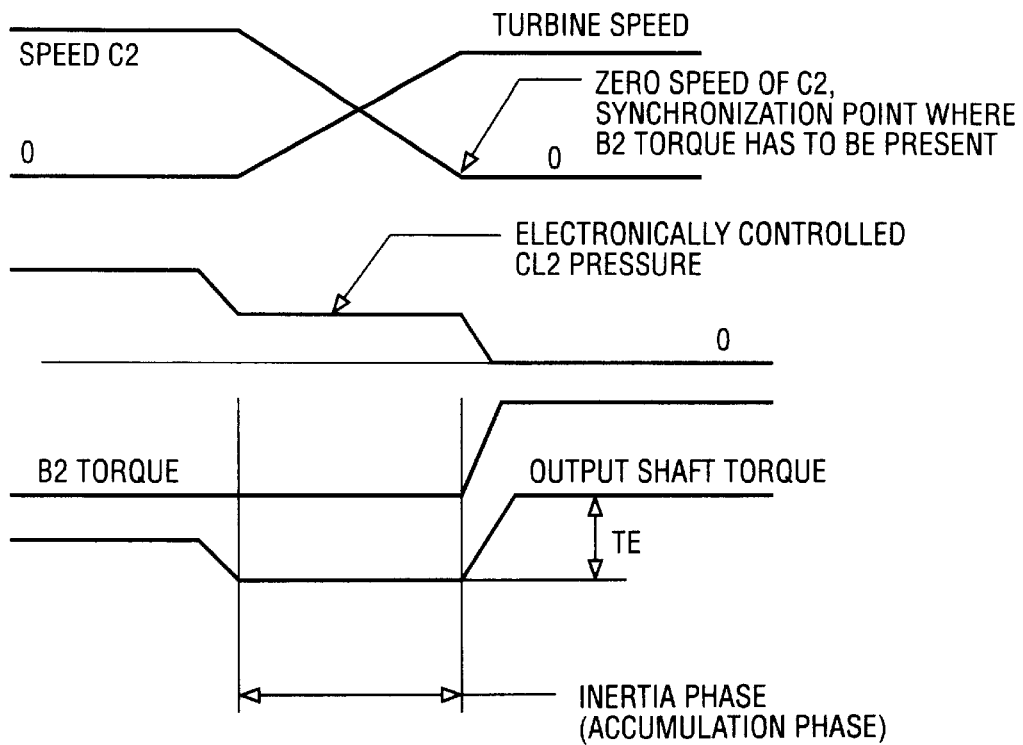
FIG. 7 is a graph showing the variation of clutch speed, turbine speed, clutch pressure, reaction brake torque and output torque during a shift interval for a gearing arrangement embodying the improvements of the invention.

The function of the 5-3/4-3 downshift system now will be described. As indicated previously, these downshifts are synchronous downshifts. Thus, the electronic control system must synchronize the release of the high clutch, which is compounded with the sun gear of the Simpson gear set, and then apply the intermediate servo B2. The synchronization point is at zero sun gear speed for the Simpson gear set. At this point, intermediate brake torque must be present. Simultaneously, the pressure profile of the high clutch has to be controlled by carrying partial capacity in order to minimize the output shaft torque disturbance TE. This is indicated in FIG. 7.

The transmission has two solenoid stages that are arranged to function as intermediate steps between third gear and fourth gear. The two intermediate steps IS1 and IS2 are achieved with shift solenoids SS1, SS2 and EPC3 control. The solenoid stages that accomplish these intermediate steps are indicated in the following table. The intermediate servo apply pressure is controlled, as previously explained, by the VFS1/MOD pressure system. EPC3 pressure generated by the variable force solenoid 84 is dedicated to the high clutch for independent capacity and deceleration profile control of the sun gear for the Simpson gear set.

| GEAR | SS1 | SS2 | CL2 | B2-Release | B2-Apply |
|---|---|---|---|---|---|
| 3rd | ON | ON | | | ▓ |
| Intermediate Step 1 (IS1) | OFF | ON | ■ | ■ | ▓ |
| Intermediate Step 2 (IS2) | OFF | OFF | ■ | PLINE | ▓ |
| 4th | OFF | OFF | ■ | PLINE | ▓ |

Shaded Area = VFS1/MOD controlled;
Light Area = Not pressurized;
Black Area = Controlled by VFS3 or VFS3/MOD.

The shift sequence for a 4-3 downshift is summarized as follows. A first option on a 4-3 downshift provides fourth gear, intermediate step 1, and third gear in that order. This option allows high clutch capacity control, as well as prestroke control of the intermediate servo, to match the zero speed synchronization point. This option can be used for high torque and low speed downshifts.

A second option uses the sequence: fourth gear, intermediate step 2 and third gear. This option allows high clutch capacity control and prevents the intermediate servo from stroking. Here, no prestroke of the intermediate servo is required. Therefore, this option can be used for low torque and high speed downshifts.

On a 5-3 downshift, the sequence is the same as the 4-3 downshift sequence (i.e. 5-IS1-3 or 5-IS2-3). In fifth gear, however, the overdrive band is applied and has to be released instantly when a 5-3 downshift is in progress.

A detailed description of intermediate step 2, the intermediate step 1, and the third gear state now will be provided.

Figure 21B:
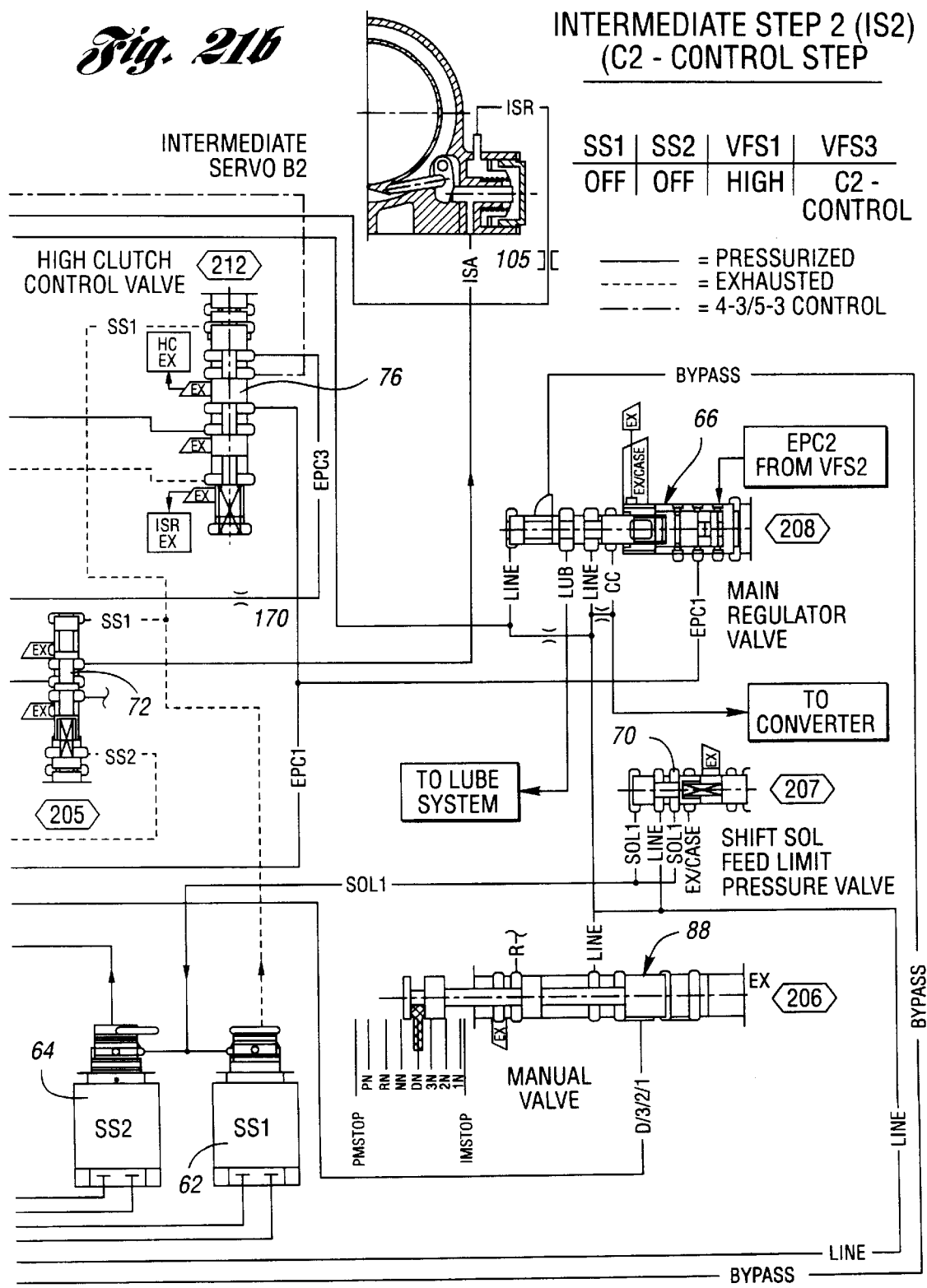

Intermediate step 2 (IS2) during a 4-3 downshift is the same as in fourth gear. This means that all the shift valves remain in the downshift position. The intermediate servo release side is applied with line pressure and the high clutch is controlled with EPC3 pressure or VFS3/MOD pressure. This is shown in FIGS. 21a and 21b and in FIGS. 25a and 25b. This initiates a 4-3 downshift by reducing EPC3 pressure or the VFS3/MOD pressure that is applied to the high clutch. The reduction of EPC3 pressure or VFS3/MOD pressure allows the deceleration of the high clutch drum, which is connected to the sun gear of the Simpson gear set.

Open loop control or closed loop control can now be applied to control deceleration or deceleration rate of the high clutch drum speed. Closed loop is carried out by using the high clutch drum speed as a feedback signal. In order to apply a closed loop control to the high clutch, very accurate and small delta pressures are necessary. Therefore, the output pressure of VFS3 is either directly connected to the high clutch without amplification or a VFS3/MOD valve is used with a small pressure amplification.

When a certain threshold of high clutch drum speed has been reached, the transmission shifts to the third gear solenoid stage. This exhausts the high clutch through the shift valve configuration for the second version illustrated in FIGS. 23a–26b into the CR/R/EX port. It also exhausts the intermediate servo release pressure into the ISR/EX port for the valve 76' of FIGS. 23a and 23b. For the first version of the control system, both pressures then are exhausted into the HC/EX port through the valve 76. The intermediate servo stroke and the intermediate brake torque is present at approximately zero speed threshold of the high clutch drum. The engagement of B2 is synchronized with zero speed of the high clutch drum.

Figure 20B:
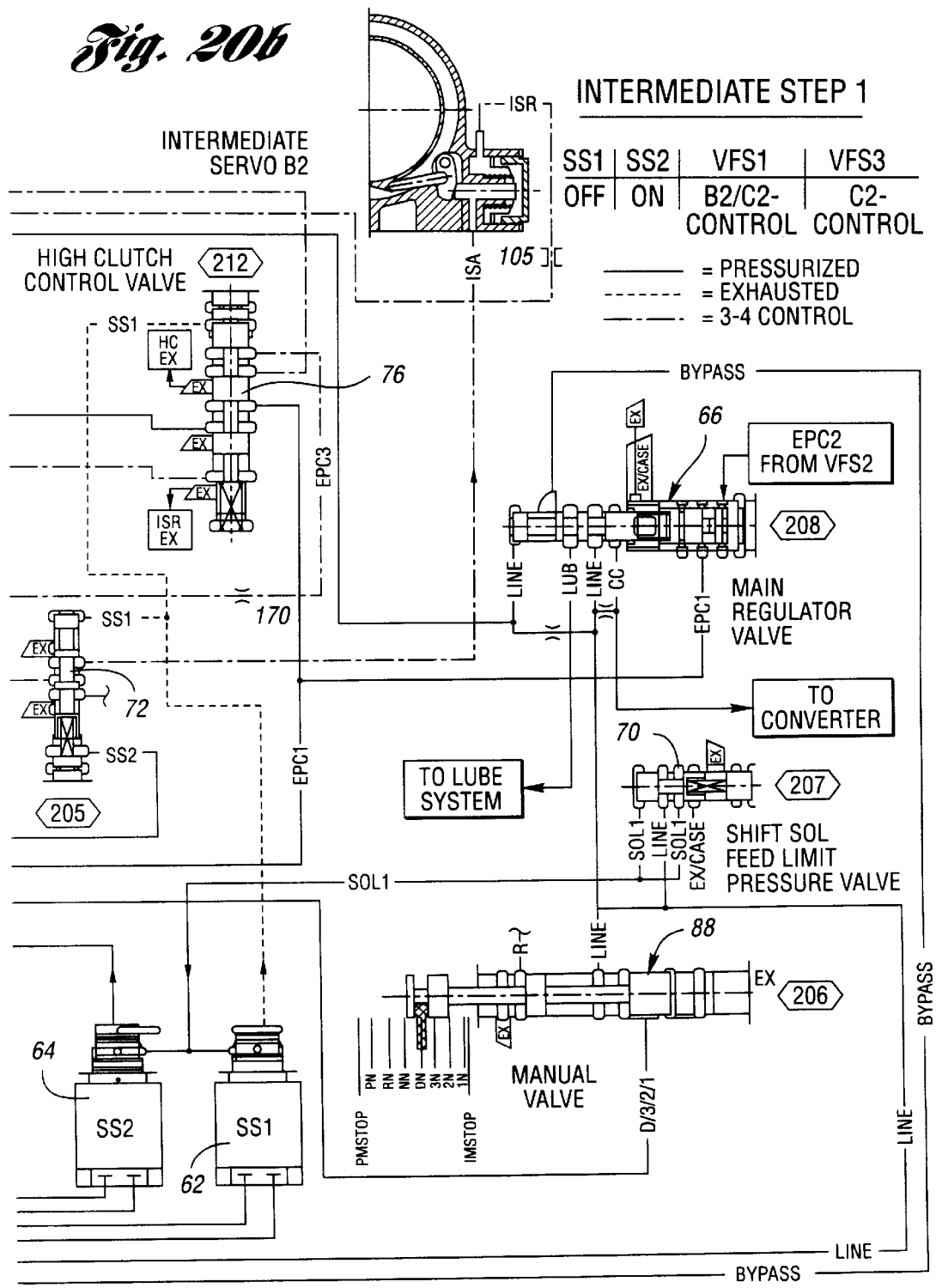

The intermediate step 1 of the 4-3 downshift control is the same solenoid stage previously described and is shown in FIGS. 20a and 20b and in FIGS. 24a and 24b. When a 4-3 downshift is initiated, the shift solenoid 2 is energized. This connects the intermediate servo release side with EPC3 pressure or VFS3/MOD pressure which is distributed also to the high clutch. The intermediate servo apply side that is subjected to VFS1/MOD pressure can now be used to prestroke the servo during high clutch drum speed profile control.

EPC3 pressure is set to pressure levels to control with either open loop or closed loop the deceleration of the high clutch drum, as explained above. The intermediate step now allows simultaneous control of the high clutch capacity and the servo stroke phase. Independent control of intermediate brake band capacity, executed by VFS1 and zero high clutch drum speed provided by VFS3, now is possible. This enables accurate synchronization between the engagement of B2 and the zero speed crossing for C2. The engagement of the intermediate brake band B2 is also triggered by a high clutch drum speed threshold that is lower than a calibratable value. When the synchronization is accomplished, the transmission shifts into third gear state where high clutch and intermediate servo release pressures are completely exhausted. The 4-3 downshift now is complete.

A simplified, alternative control method for a 4-3 downshift now will be described.

Figure 17:
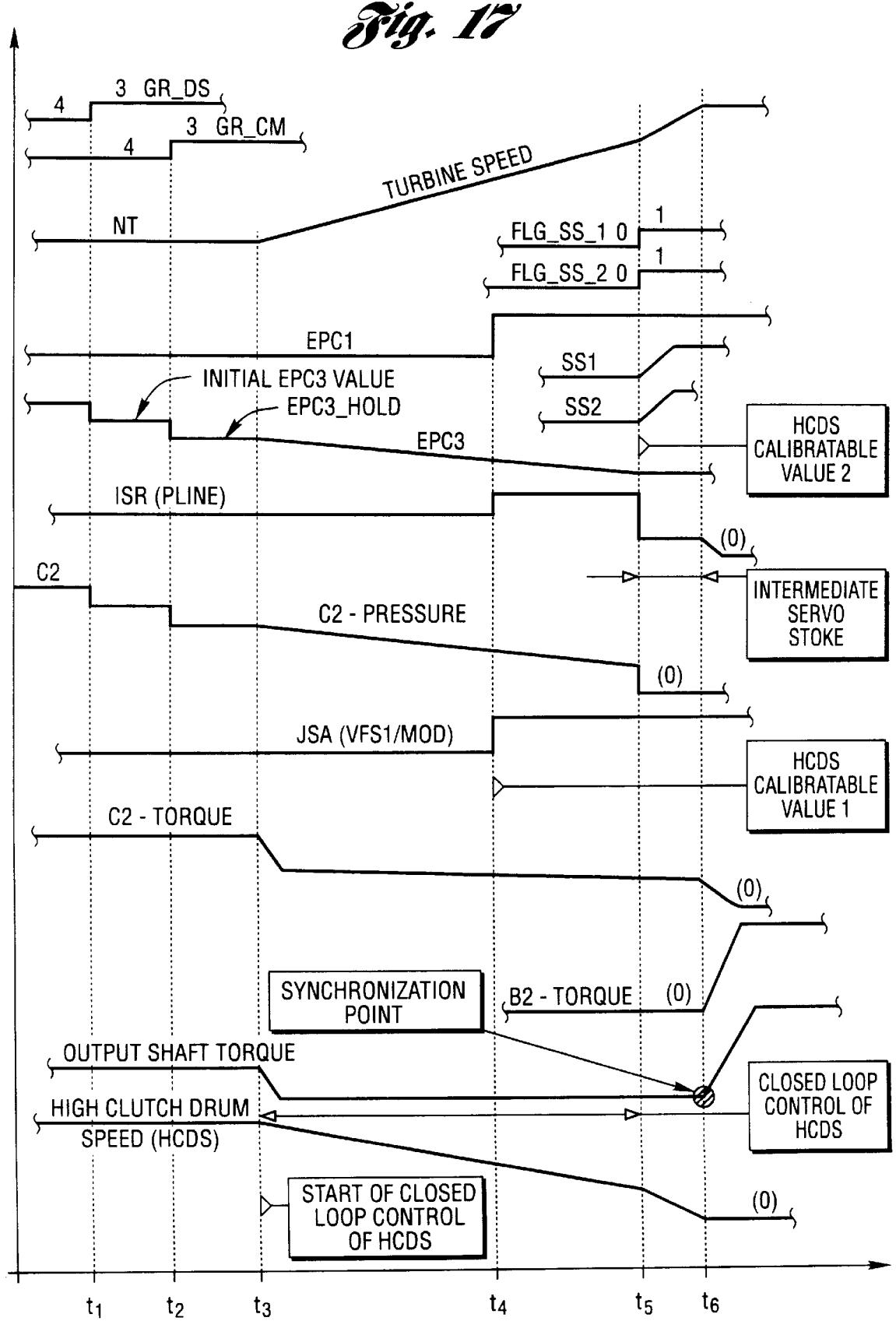
FIG. 17 is a timing diagram showing the variations of the high clutch drum speed, high clutch pressure, clutch torque, turbine speed, and intermediate servo pressures during a ratio change from fourth gear through a first intermediate step to the third ratio.
Figure 18:
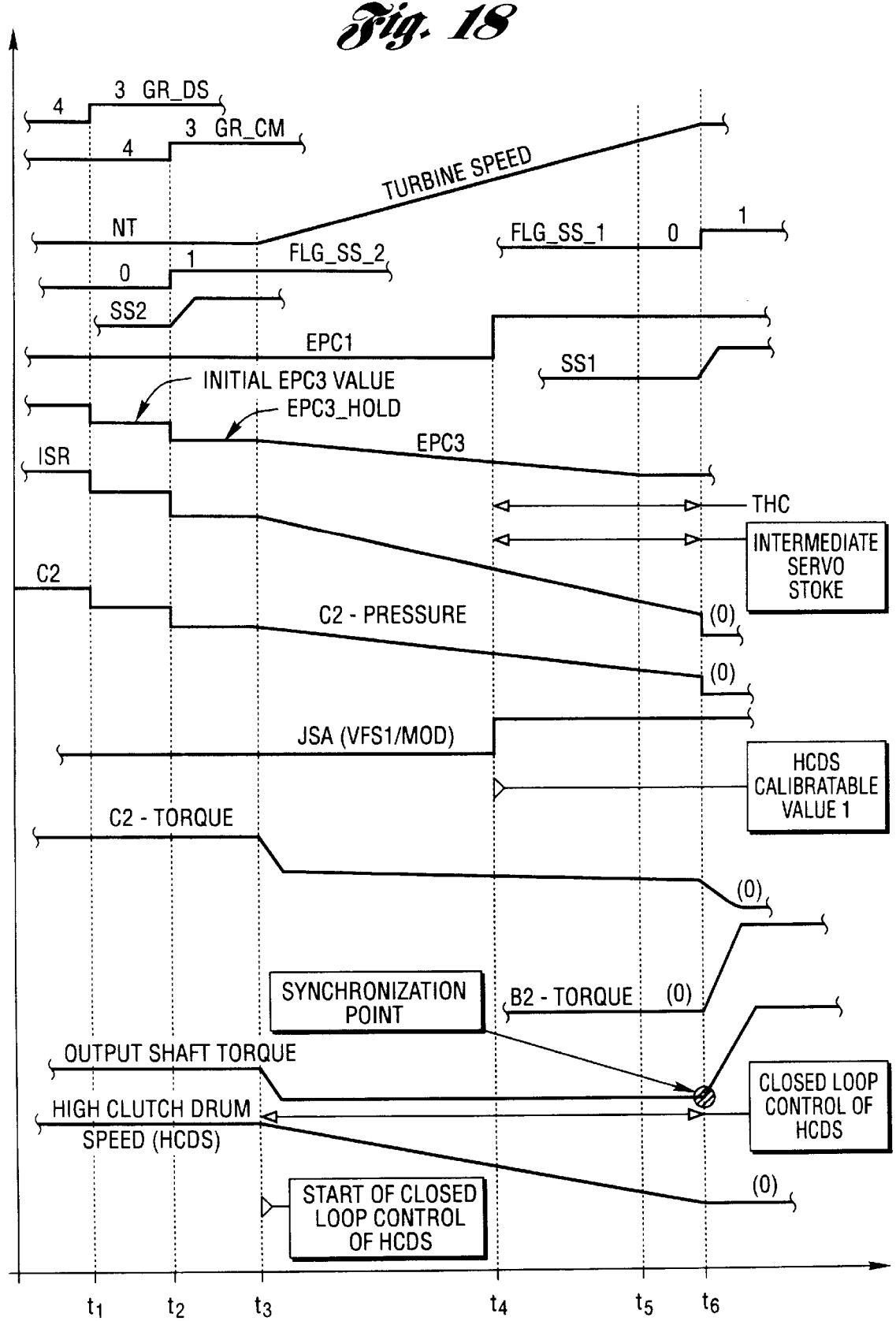
FIG. 18 is a timing diagram corresponding to the diagram of FIG. 17 showing pressures and speeds that are characteristic of a 4-3 downshift during the shift interval including a second intermediate step.

Option 1, as shown in FIG. 18 of the simplified strategy, would use intermediate step 1. For option 2, as shown in FIG. 17, intermediate step 2 would be used.

At t1, the driver desires a 4-3 downshift, which is triggered by functions of throttle position versus vehicle speed. The GR_DS register is changed to 3 and the shift verification timer TM_VER_SFT is loaded. The EPC3 pressure value is set to an initial value to get prepared for closed loop control.

The EPC3 pressure or VFS3/MOD pressure is set to an initial value, which still holds high clutch capacity.

At t2, the shift verification timer TM_VER_SFT is expired and the gear commanded register GR_CM is changed to 3.

A "Hold" EPC3 value is calculated based on input torque, which marginally holds the CL2 capacity. This is required to set the CL2 capacity to a value close to closed loop control settings. This is calculated as follows:

$$EPC3\_HOLD = \frac{TQ\_SIMP * RATIO\_C2}{GAIN\_C2}$$

where:
EPC3_HOLD=Hold EPC3 pressure to maintain marginally C2 capacity;
TQ_SIMP=Input torque into Simpson set;
GAIN_C2=C2 capacity gain; and
RATIO_C2 Ratio of C2 torque to input torque.

For option 1 only, the shift solenoid flag 1 FLG_SS_1 is set to 1. The EPC3 pressure or VFS3/MOD pressure is decreased on the high clutch since EPC3 pressure has been decreased to a "HOLD" level which marginally holds CL2 capacity. The high clutch capacity can be manipulated by the EPC3 settings or by the VFS3/MOD settings and high clutch drum slip can be introduced prior to closed loop control clutch capacity.

For option 1 only, the shift solenoid 1 is deenergized and the high clutch control valve 76 moves into downshift position. This connects EPC3 pressure or VFS3/MOD pressure to the high clutch and the intermediate servo release side and allows the intermediate servo to be prestroked.

At t3, a PID controller is used to control with capacity manipulation the derivative of the high clutch drum speed (dHCDS/dt). The control block diagram is shown in FIG. 9.

The target derivative high clutch drum speed is calculated from tables of throttle position versus vehicle speed. This is required in order to have dedicated target values for dedicated shifts at dedicated vehicle speeds and throttle positions. The individual target value will be adjusted for a dedicated downshift by a multiplier which is a function of gear ratio. This multiplier provides an opportunity to design a derivative of second order.

DHCDS_TRG=DHCDS_TRG*FN(RATIO)

DHCDS_TRG=Target derivative high clutch drum speed;
FN(RATIO)=Multiplier of target value versus (an example is shown below).

Figure 8:
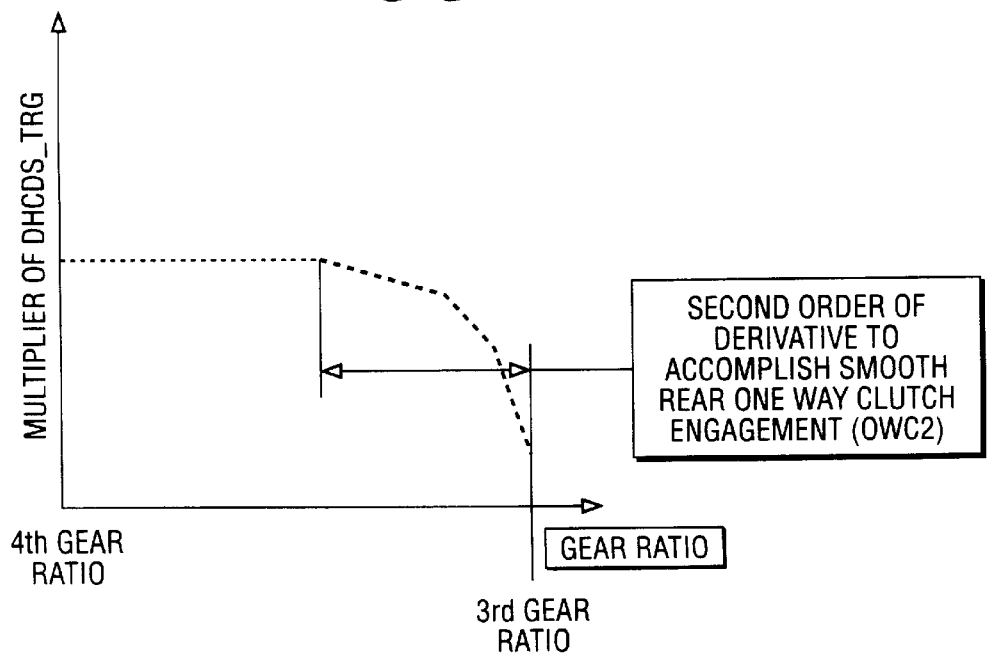
FIG. 8 is a plot of the multiplier value that is used to determine the derivative of the high clutch drum speed, which is one of the variables used during electronic pressure control functions of the control system of the invention.

The multiplier for the target derivative high clutch drum speed is plotted against gear ratio in FIG. 8.

The error of derivative high clutch drum speed is calculated as follows:

e_DHCDS=DHCDS_ACT-DHCDS_TRG where:
DHCDS_ACT=actual derivative high clutch drum speed;
DHCDS_TRG=target derivative high clutch drum speed.

In order to calculate the PID controller output, the errors up to two calculation loops backwards are needed. They are as follows:
e_DHCD_T0=error at the current calculation loop;
e_DHDS_T1=error one calculation loop back; and
e_DHDS_T2=error two calculation loops back.
The PID controller output is now calculated as follows:

ΔP_PID=Kc*(Kp*(e_HCDS_T0−e_HCDS_T1)+Ki*e_HCDS_T0+Kd*(e_HCDS_T0_2*e_HCDS_T1+e_HCDS_T2)).

This is the velocity algorithm which is used when the actuator, which is in this case a variable force solenoid, has an integral behavior; and
Kp=proportional gain
Ki=integral gain
Kd=derivative gain
Kc=overall gain The controller gains should be selectable from a table of throttle position (TP) versus vehicle speed (VS). This is required since the 4-3 downshifts occur at different throttle positions and vehicle speeds.

The commanded VFS3 pressure (EPC3) is now calculated. EPC3 is the control pressure to manipulate the high clutch capacity (C2). When the PID control is initiated, the EPC3_HOLD value is loaded into the EPC3 register, i.e., EPC3=EPC3_HOLD
EPC3=(EPC3+ΔP_PID+ΔP_FF)*FN(TOT)
ΔP_PID=PID portion of EPC1 pressure
ΔP_FF=Feed forward term which is used to add pressure when a change in input torque is taking place $$\Delta P\_FF = \frac{\Delta TQ\_TRANS * RATIO\_C2}{Gain\_C2}$$

ΔTQ_TRANS=Delta input torque generated by sudden throttle position changes.
FN(TOT)=Temperature compensation of EPC3 pressure.

The EPC3 calculation takes the error between the actual derivative high clutch drum speed DHCDS and the target derivative high clutch drum speed into account and converts the calculated error in an EPC3 value. This adjusts the deceleration characteristic of the high clutch drum.

The high clutch pressure is decreased or increased depending on the control pressure applied on the clutch to follow the target high clutch drum speed profile.

At t4 in option 1, the high clutch drum speed is less than a calibratable value 1. The EPC1 pressure is set high to initiate the intermediate servo stroke phase in order to meet the C2/B2 synchronization point. Since the derivative of the high clutch drum speed is controlled closed loop from t3 through t4, the time up to the zero speed point crossing can be calculated as follows:

$$THC = \frac{HCDS(t4) * \Delta t}{\Delta HCDS}$$

where:
THC=Time up to the zero crossing of the high clutch drum speed;
HCDS(t4)=High clutch drum speed at time point t4;
Δt=Time between two high clutch drum speed calculations; and
ΔHCDS=Delta high clutch drum speed at the start and the end of the time interval Δt which represents DHCDS.
This assumes that the derivative of the high clutch drum speed will remain constant up to the zero crossing point.

When the stroke time of the intermediate servo at a given VFS3 pressure and VFS1/MOD pressure is known, the high clutch drum speed threshold value (which is referred to as "calibratable value 1" in FIG. 18) when the intermediate servo starts to stroke can be calculated. This leads then to an accurate synchronization of the zero speed crossing of the high clutch drum speed and the engagement of the intermediate band.

In option 2, the EPC1 pressure is raised to accelerate the intermediate servo stroke phase, which is initiated at point t5.

In option 1, the VFS1/MOD pressure is raised and the intermediate servo starts to stroke to meet the synchronization point at t6.

In option 2, the VFS1/MOD pressure is raised to a level, which causes a fast intermediate servo stroke phase initiated at point t5.

At t5, for option 2 only, the high clutch drum speed is smaller than a calibratable value 2, which triggers the reset of shift solenoid flags FLG_SS_1 and FLG_SS_2. This initiates the intermediate servo stroke phase.

The shift solenoids 62 and 64 are energized. The high clutch control valve in bore 76 and the intermediate servo control valve 74 are downshifted. The high clutch and the intermediate servo release pressures are exhausted as previously explained. The high clutch drum speed will now be decelerated by the engine torque without EPC3 pressure control. A second shift slope is initiated, which leads to the zero speed crossing point. The intermediate servo starts to stroke in order to meet the synchronization point at t6.

At t6, option 1, the shift solenoid flag 1 FLG_SS_1 is set to 1.

In options 1 and 2, the high clutch drum speed is at or near zero. The intermediate servo engages and transmits torque. The B2 reaction torque increases. The B2 sun gear torque of the Simpson planetary gear set is grounded against the transmission case by the intermediate brake band. The transmission is in third gear.

For option 1, the shift solenoid 1 is energized. This moves the high clutch control valve into downshift position. The high clutch and the intermediate servo release pressure are exhausted through the shift valve 74 into the ISR/EX and CR/R/EX ports (see FIGS. 20a, 20b, 24a and 24b). Previously, both pressures were controlled and exhausted over the VFS3-EX port at the variable force solenoid 84 (VFS3).

The shift sequence for open loop controlled 4-3/5-3 downshifts are the same as the closed loop controlled shifts described above. The open loop control method would use EPC3 pressure ramps to trigger the deceleration of the high clutch drum speed. The high clutch drum speed would then be monitored and the servo stroke phase then would be initiated (t4). When the high clutch drum speed is not available, an open loop control timer could be used. It would start expiring from t2 and would expire at t4, for example, to trigger the intermediate servo stroke phase.

Closed loop control of the derivative of the high clutch drum speed would not take place.

It should be understood that while preferred embodiments of the invention have been shown and described, all possible variations of the invention are not disclosed. Alternative designs may be created by one of ordinary skill in the art without departing from the spirit and scope of the invention as set forth in the following claims, which are intended to cover all such alternative designs as well as equivalents thereof.

What is claimed is:

1. A shift control valve system for a multiple ratio automatic transmission forming plural torque flow paths from an engine to a torque output shaft;
   planetary gear elements including a sun gear, a ring ear and a planetary carrier assembly defining said torque flow paths;
   a high ratio clutch means for connecting together two of said gear elements for rotation in unison, thereby establishing a high ratio;
   an underdrive brake means for anchoring one of said gear elements thereby establishing an underdrive ratio;
   said clutch means including a high ratio clutch servo having a clutch apply pressure chamber;
   said underdrive brake means including an underdrive brake servo having a brake apply pressure chamber and a brake release pressure chamber;
   said control valve system having a control pressure pump drivably connected to said engine, a first solenoid operated valve means for controlling pressure in said brake apply pressure chamber, and a second solenoid operated valve means for controlling pressure in said brake release pressure chamber and in said clutch apply pressure chamber whereby improved ratio shift quality is effected;
   said underdrive brake servo comprising a brake actuating piston defining in part said brake apply and brake release pressure chambers on opposite sides thereof as said brake actuating piston is stroked;
   said first solenoid operated valve means effecting a variable underdrive brake servo apply force on said brake actuating piston and said second solenoid operated valve means effecting a variable underdrive brake servo release force on said brake actuating piston whereby said first and second solenoid operated valve means allow clutch means capacity control by achieving variable stroke times independent of the stroke distance of said servo to improve ratio upshift quality.

2. A shift control valve system for a multiple ratio automatic transmission forming plural torque flow paths from an engine to a torque output shaft;

planetary gear elements including a sun gear, a ring gear and a planetary carrier assembly defining said torque flow paths;

a high ratio clutch means for connecting together two of said gear elements for rotation in unison, thereby establishing a high ratio;

an underdrive brake means for anchoring one of said gear elements thereby establishing an underdrive ratio;

said clutch means including a high ratio clutch servo having a clutch apply pressure chamber;

said underdrive brake means including an underdrive brake servo having a brake apply pressure chamber and a brake release pressure chamber;

said control valve system having a control pressure pump drivably connected to said engine, a first solenoid operated valve means for controlling pressure in said brake apply pressure chamber, and a second solenoid operated valve means for controlling pressure in said brake release pressure chamber and in said clutch apply pressure chamber whereby improved ratio shift quality is effected;

said control valve system including a first modulator valve means defining in part a fluid connection between said first solenoid operated valve means for modifying the rate of pressure build-up in said underdrive servo brake apply pressure chamber and a second modulator valve means defining in part a fluid connection between said second solenoid operated valve means and both said high ratio clutch apply pressure chamber and said underdrive brake release pressure chamber for modifying the rate of pressure build-up in said high ratio clutch apply pressure chamber and said underdrive brake release pressure chamber thereby achieving a variation in the duration and in the torque characteristic for the inertia phase of the ratio upshift and improving the ratio upshift quality.

3. A shift control valve system for a multiple ratio automatic transmission forming plural torque flow paths from an engine to a torque output shaft;

planetary gear elements including a sun gear, a ring gear and a planetary carrier assembly defining said torque flow paths;

a high ratio clutch means for connecting together two of said gear elements for rotation in unison, thereby establishing a high ratio;

an underdrive brake means for anchoring one of said gear elements thereby establishing an underdrive ratio;

said clutch means including a high ratio clutch servo having a clutch apply pressure chamber;

said underdrive brake means including an underdrive brake servo having a brake apply pressure chamber and a brake release pressure chamber;

said control valve system having a control pressure pump drivably connected to said engine, a first solenoid operated valve means for controlling pressure in said brake apply pressure chamber, and a second solenoid operated valve means for controlling pressure in said brake release pressure chamber and in said clutch apply pressure chamber whereby improved ratio shift quality is effected; and wherein said first and second solenoid operated valve means are variable force solenoids.

4. A shift control valve system for a multiple ratio automatic transmission forming plural torque flow paths from an engine to a torque output shaft;

planetary gear elements including a sun gear, a ring gear and a planetary carrier assembly defining said torque flow paths;

a high ratio clutch means for connecting together two of said gear elements for rotation in unison, thereby establishing a high ratio;

an underdrive brake means for anchoring one of said gear elements thereby establishing an underdrive ratio;

said clutch means including a high ratio clutch servo having a clutch apply pressure chamber;

said underdrive brake means including an underdrive brake servo having a brake apply pressure chamber and a brake release pressure chamber;

said control valve system having a control pressure pump drivably connected to said engine, a first solenoid operated valve means for controlling pressure in said brake apply pressure chamber, and a second solenoid operated valve means for controlling pressure in said brake release pressure chamber and in said clutch apply pressure chamber whereby improved ratio shift quality is effected;

said planetary gear elements including overdrive gearing including an overdrive reaction gear element, an overdrive brake servo means having an overdrive brake apply chamber for anchoring said overdrive reaction gear element during overdrive operation;

solenoid operated shift control valve means in said control valve system for distributing selectively fluid pressure to said brake servo pressure chambers for said intermediate brake servo and to said overdrive brake apply chamber;

an electronic controller having memory portions, a processor portion, signal input portions and output driver portions, the latter being electronically connected to said shift control valve means and to said first and second solenoid operated valve means;

said high ratio clutch having a clutch drum connected to a reaction element of said planetary gear elements;

means for developing driver-selected input control signals, engine speed and torque input signals and transmission operating input signals, said signals developing means being connected to said signal input portions, said transmission operating signals including a high clutch drum speed signal;

said processor portion acting on control algorithms stored in said memory portions to use information developed by said input signal developing means to establish output signals at said output driver portions; and said solenoid operated shift control valve means effecting overdrive to underdrive ratio downshift in response to a solenoid state change from overdrive state to underdrive state.

5. The shift control valve system as set forth in claim 4 including an underdrive brake servo apply chamber pressure modulator valve means between said first solenoid operated valve means and said brake apply pressure chamber for controlling stroking of said underdrive brake servo independently of pressure in said high clutch apply pressure chamber whereby pre-stroking of said underdrive brake servo reduces stroke time for low-speed downshifts.

6. The shift control valve system as set forth in claim 4 including a system pressure regulator communicating with said second solenoid operated valve means for applying an electronic pressure control signal to said system pressure regulator valve for changing torque capacity of said high clutch servo and said underdrive brake servo release pressure chamber.

7. The shift control valve system as set forth in claim 4 wherein said first and second solenoid operated valve means are variable force solenoids.

8. A shift control valve system for a multiple ratio automatic transmission forming plural torque flow paths from an engine to a torque output shaft;

planetary gear elements including a sun gear, a ring gear and a planetary carrier assembly defining said torque flow paths;

a high ratio clutch means for connecting together two of said gear elements for rotation in unison, thereby establishing a high ratio;

an underdrive brake means for anchoring one of said gear elements thereby establishing an underdrive ratio;

said clutch means including a high clutch drum and a high ratio clutch servo having a clutch apply pressure chamber;

said underdrive brake means including an underdrive brake servo having a brake servo apply pressure chamber and a brake servo release pressure chamber;

said control valve system having a control pressure pump drivably connected to said engine, a first solenoid operated valve means for controlling pressure in said brake servo apply pressure chamber and a second solenoid operated valve means for controlling pressure in said brake servo release pressure chamber and in said clutch apply pressure chamber whereby improved ratio shift quality is effected;

solenoid operated shift control valve means in said control valve system for distributing selectively fluid pressure to said brake servo pressure chambers and said clutch pressure chamber;

an electronic controller having memory portions, a processor portion, signal input portions and output driver portions, the latter being electronically connected to said shift control valve means and to said first and second solenoid operated valve means;

said high ratio clutch having a clutch drum connected to a reaction element of said planetary gear elements; and means for developing driver-selected input control signals, engine speed and torque input signals and transmission operating input signals, said signal developing means being connected to said signal input portions, said transmission operating signals including a high clutch drum speed signal.

9. The shift control valve system as set forth in claim 8 including a high ratio clutch control valve, an underdrive brake servo apply control valve and an underdrive brake servo release control valve wherein said solenoid-operated shift control valve means includes a first shift solenoid valve communicating with said high ratio clutch control valve and said intermediate servo apply control valve and a second shift solenoid valve communicating with said underdrive brake servo release control valve and said underdrive servo apply control valve thereby providing separate fluid pressure distribution paths that communicate with said high ratio clutch apply pressure chamber, said brake servo release pressure chamber and said brake servo apply pressure chamber.

10. The shift control valve system as set forth in claim 8 including means for electronically controlling synchronization of the application of brake torque of said underdrive brake servo at zero speed of said clutch drum thereby improving the quality of low-speed, high-torque downshifts and high-speed, low-torque downshifts.

11. The shift control valve system as set forth in claim 10 whereby said means for electronically controlling synchronization includes a drum speed sensor for monitoring speed of said clutch drum and means for controlling deceleration of said clutch drum speed during a shift interval by means of a control loop feedback thereby achieving synchronization of brake servo application at a speed of said high ratio clutch drum near zero by controlling high ratio clutch servo capacity.

* * * * *